United States Patent [19]

Handy

[11] Patent Number: 5,129,463
[45] Date of Patent: Jul. 14, 1992

[54] CONSERVATION TILLAGE IMPLEMENT CONVERTIBLE FOR END TRANSPORT

[76] Inventor: Barry L. Handy, P.O. Box 2520, Scobey, Mont. 59263

[21] Appl. No.: 536,156

[22] Filed: Jun. 7, 1990

[51] Int. Cl.$^5$ .............................................. A01B 73/00
[52] U.S. Cl. .................................. 172/248; 172/259; 172/310; 172/443; 172/467
[58] Field of Search ............... 172/248, 254, 310, 443, 172/467

[56] References Cited

U.S. PATENT DOCUMENTS

| | | | |
|---|---|---|---|
| 3,511,318 | 5/1970 | Boetto et al. | 172/248 |
| 3,705,560 | 12/1972 | Lappin | 172/310 X |
| 4,119,329 | 10/1978 | Smith | 172/248 X |
| 4,186,805 | 2/1980 | Repski | 172/248 |
| 4,361,341 | 11/1982 | Gustafson | 172/248 |
| 4,506,904 | 3/1985 | Kinzenbaw | 172/248 |
| 4,609,203 | 9/1986 | Steilew et al. | 172/443 X |
| 4,800,962 | 1/1989 | Murray | 172/248 X |
| 4,819,738 | 4/1989 | Fountain | 172/248 X |
| 4,821,811 | 4/1989 | Swenson | 172/248 |

Primary Examiner—Peter M. Cuomo
Assistant Examiner—Tim Aberle
Attorney, Agent, or Firm—Hovey, Williams, Timmons & Collins

[57] ABSTRACT

A large tillage implement provided with hinging wing sections is adapted for end towing rather than wing-up folding transport. The hitch which is normally centered at the front of the machine may be swung into a folded condition parallel with the longitudinal axis of the frame and overlying the front portion thereof to project the hitch coupling to the vehicle outwardly beyond the end of the frame. A front row of tillage shanks can be selectively raised or lowered as desired while leaving the rear row of shanks at their normal elevations for ground working, and a special frame design enables the rear ground wheels of the frame to be position in close fore-and-aft proximity to the rear tillage shanks to provide more uniform depth of penetration of the shanks as rises and falls in the ground terrain are encountered. Improved trash flow and reduced trash and residue accumulation are achieved through strategic ground wheel location relative to the tillage shanks and streamlined wheel arm designs associated with the wheel assemblies.

37 Claims, 11 Drawing Sheets

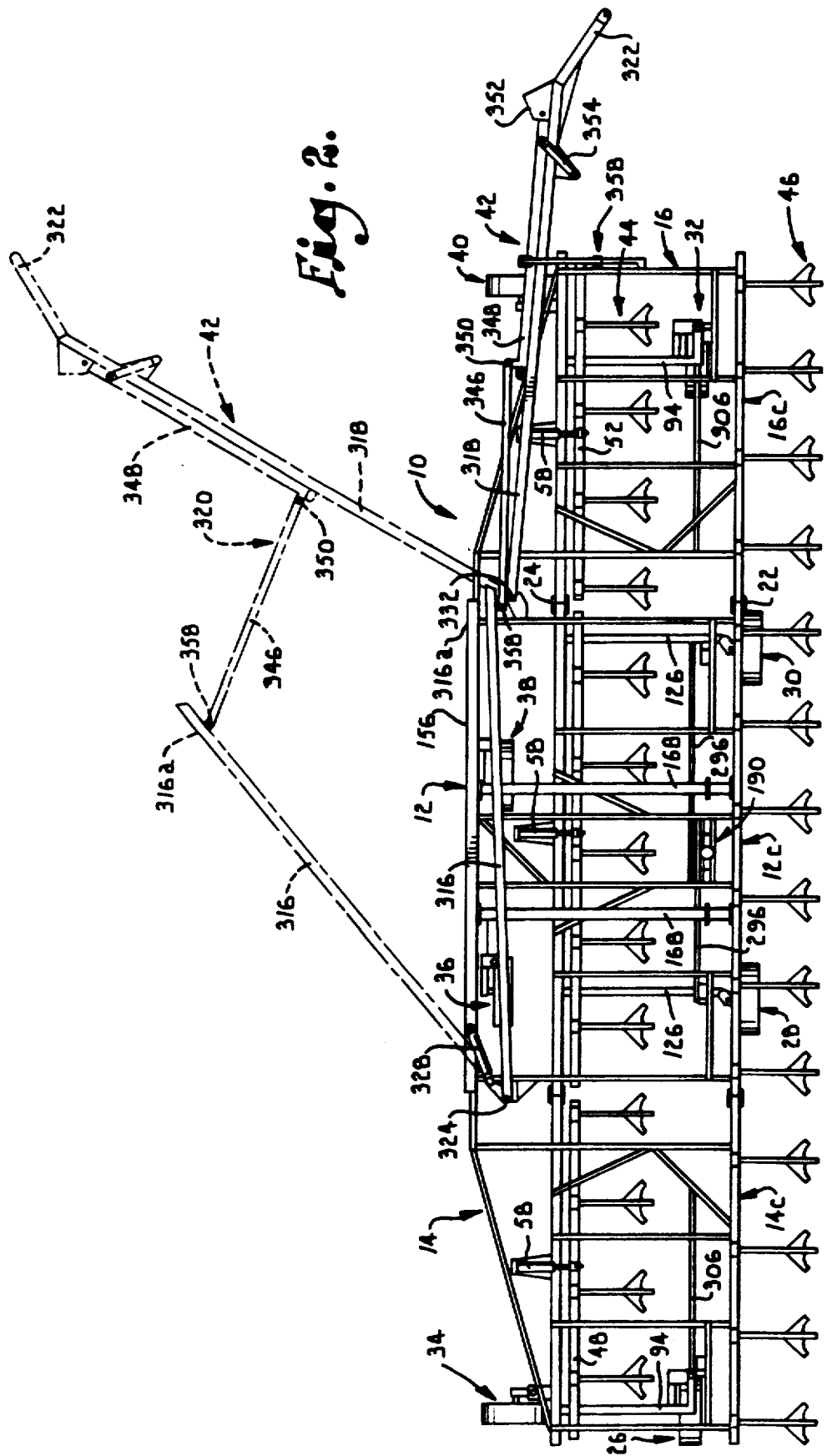

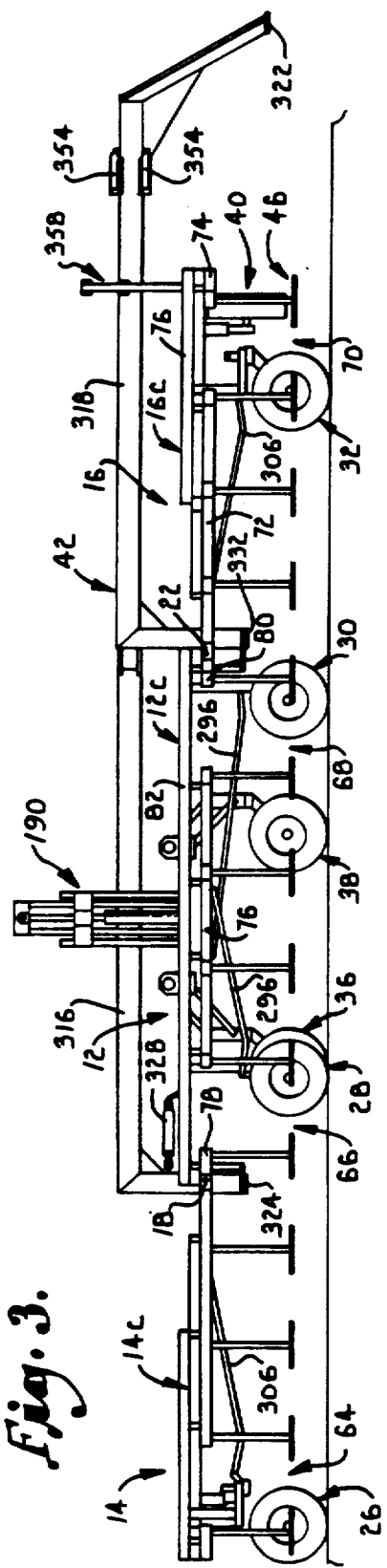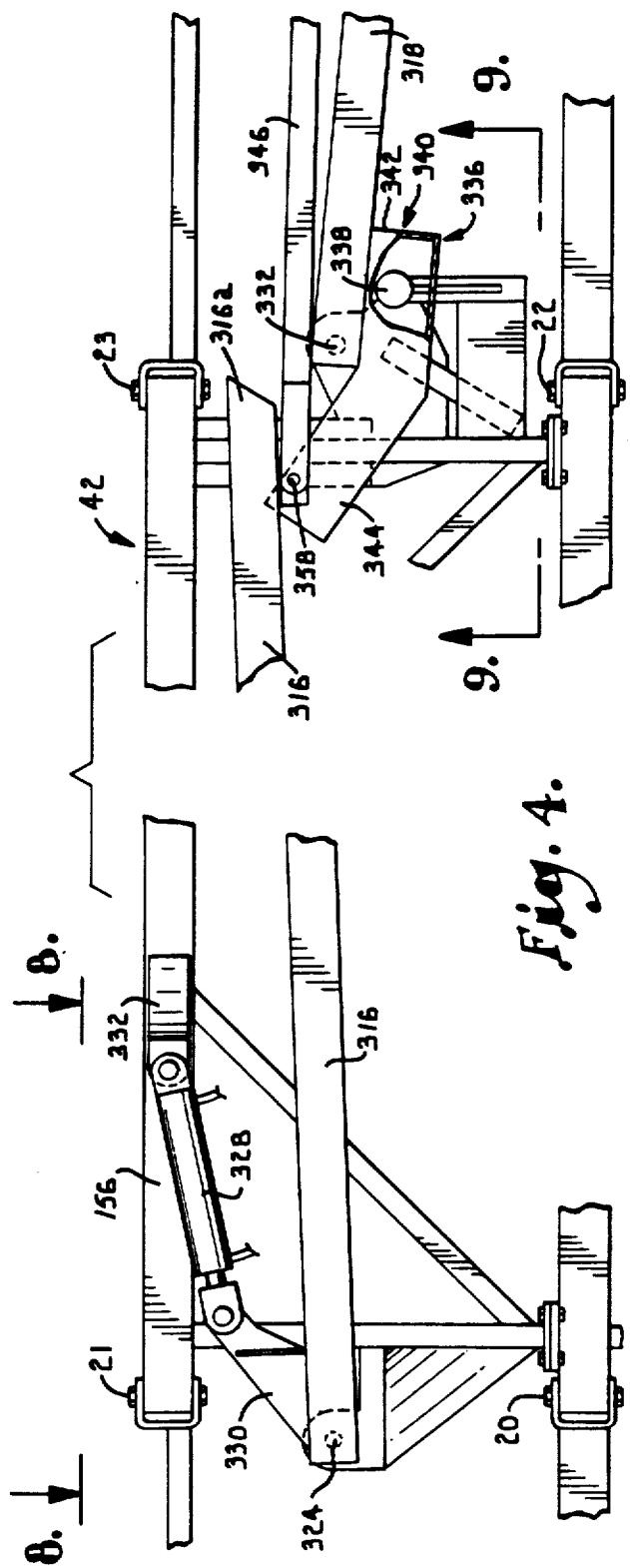

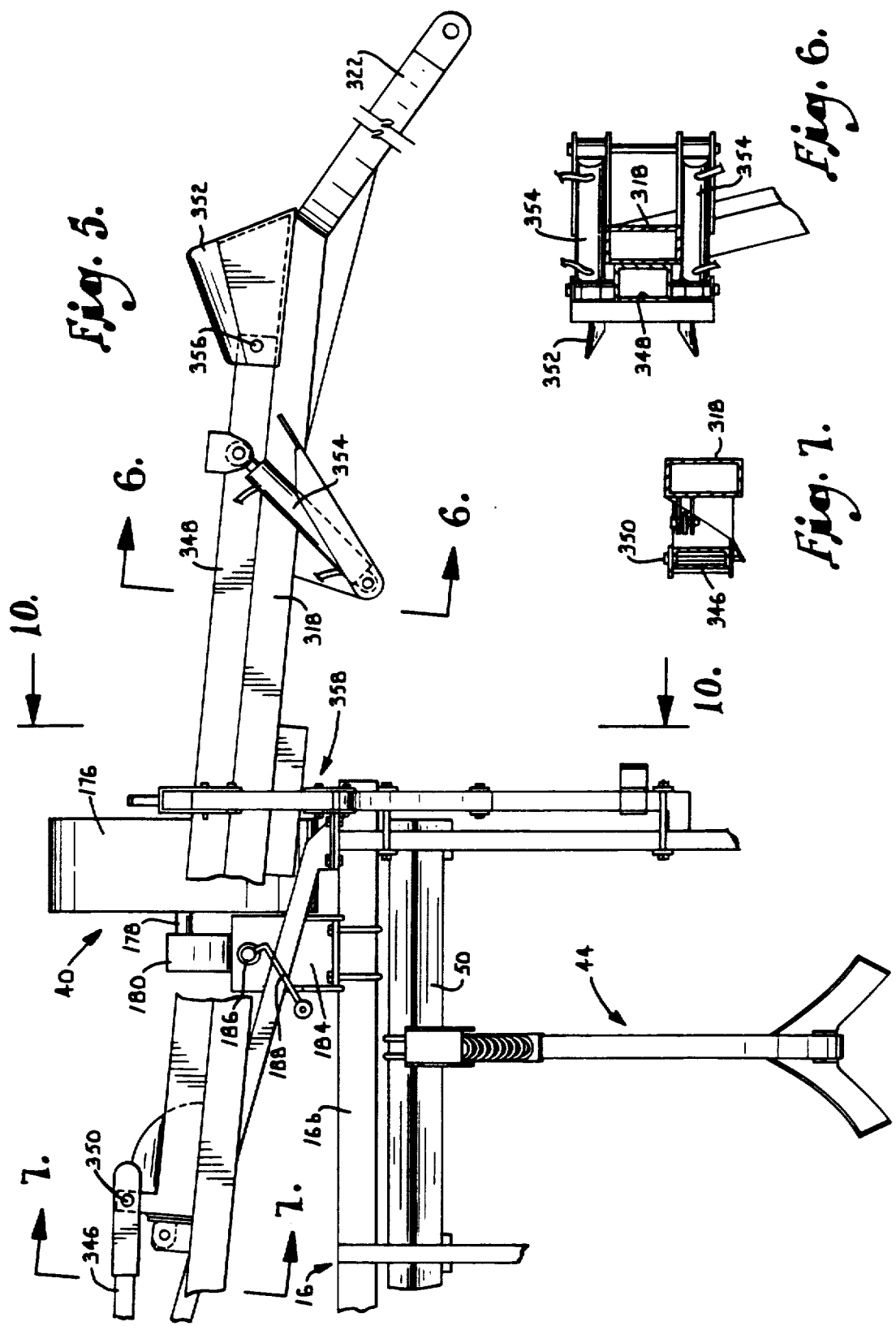

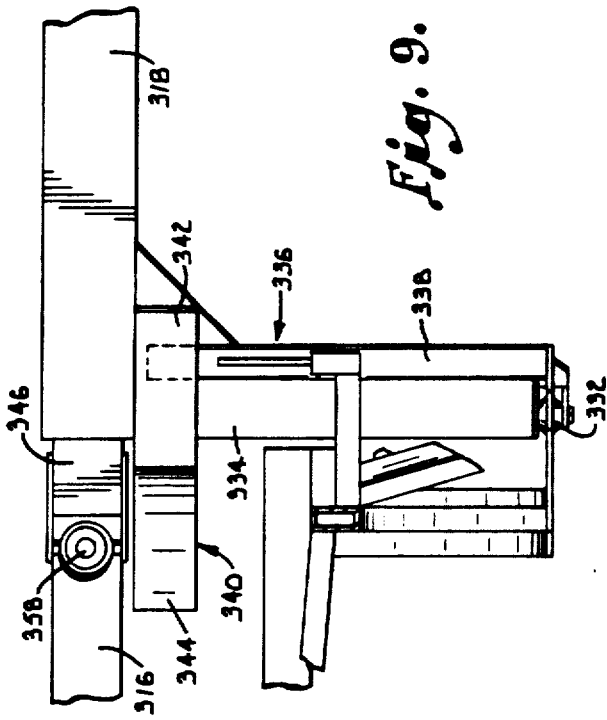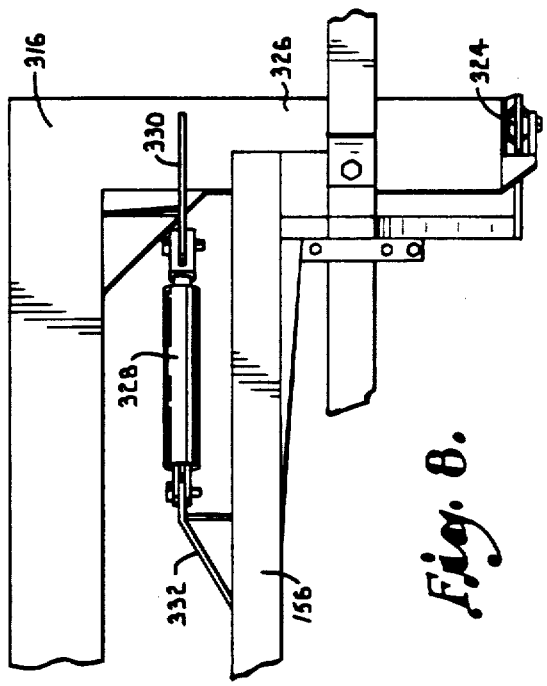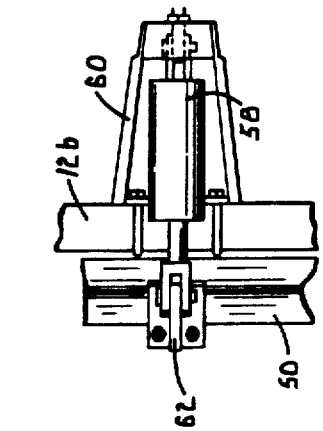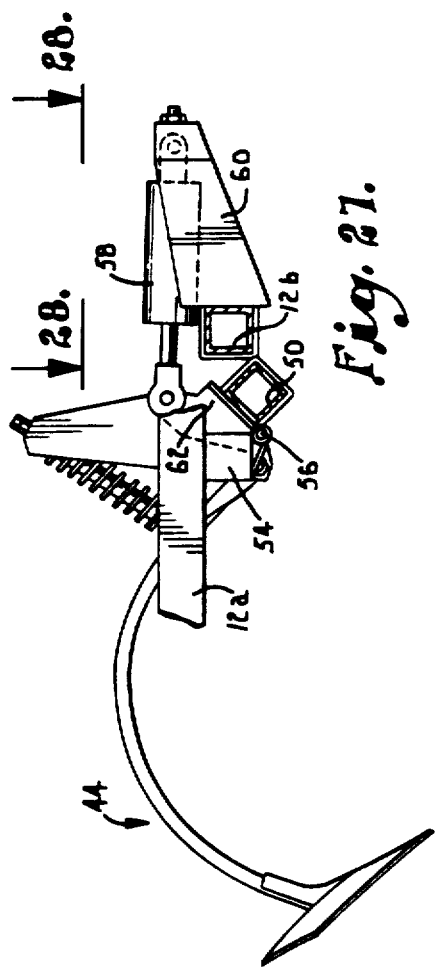

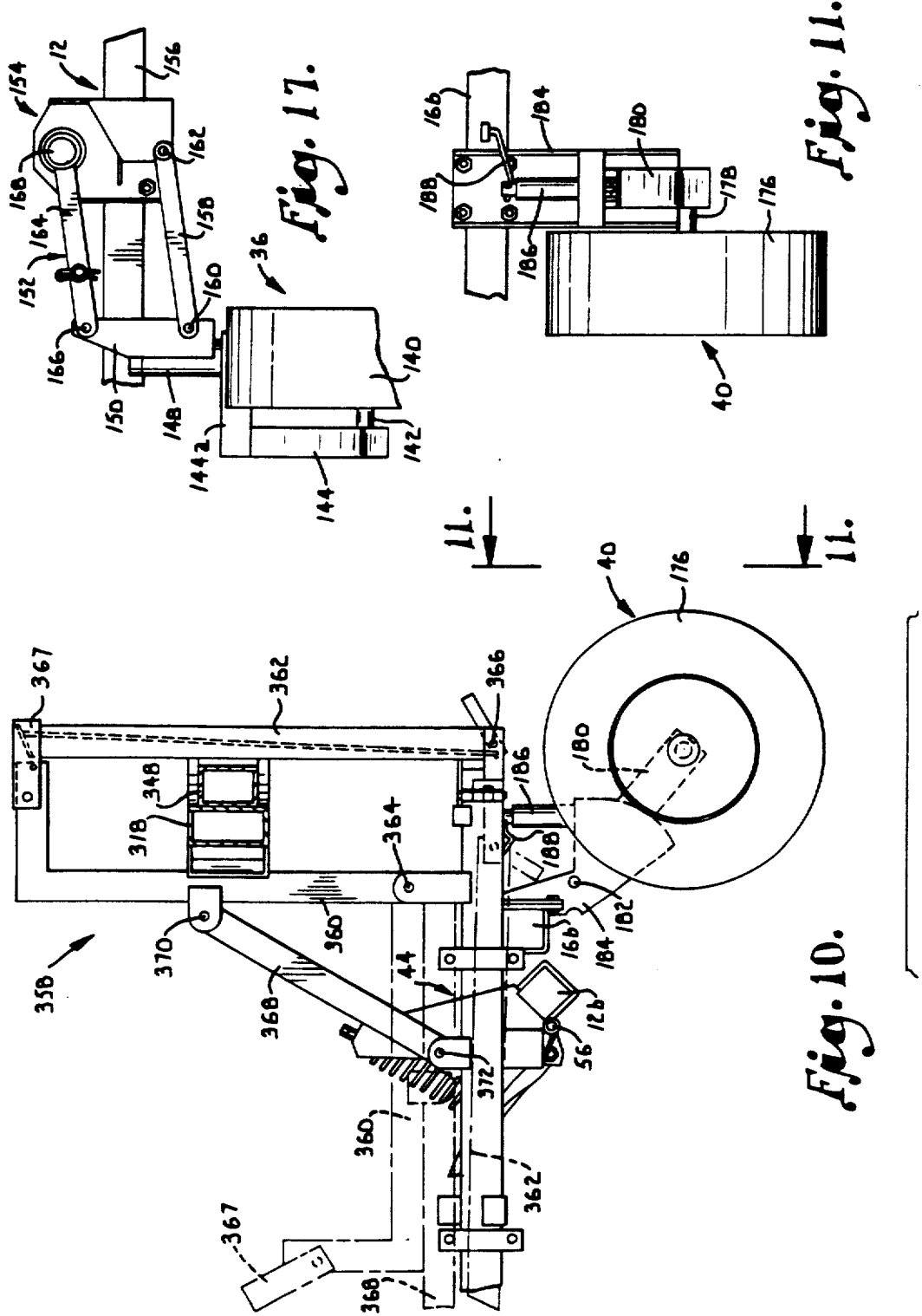

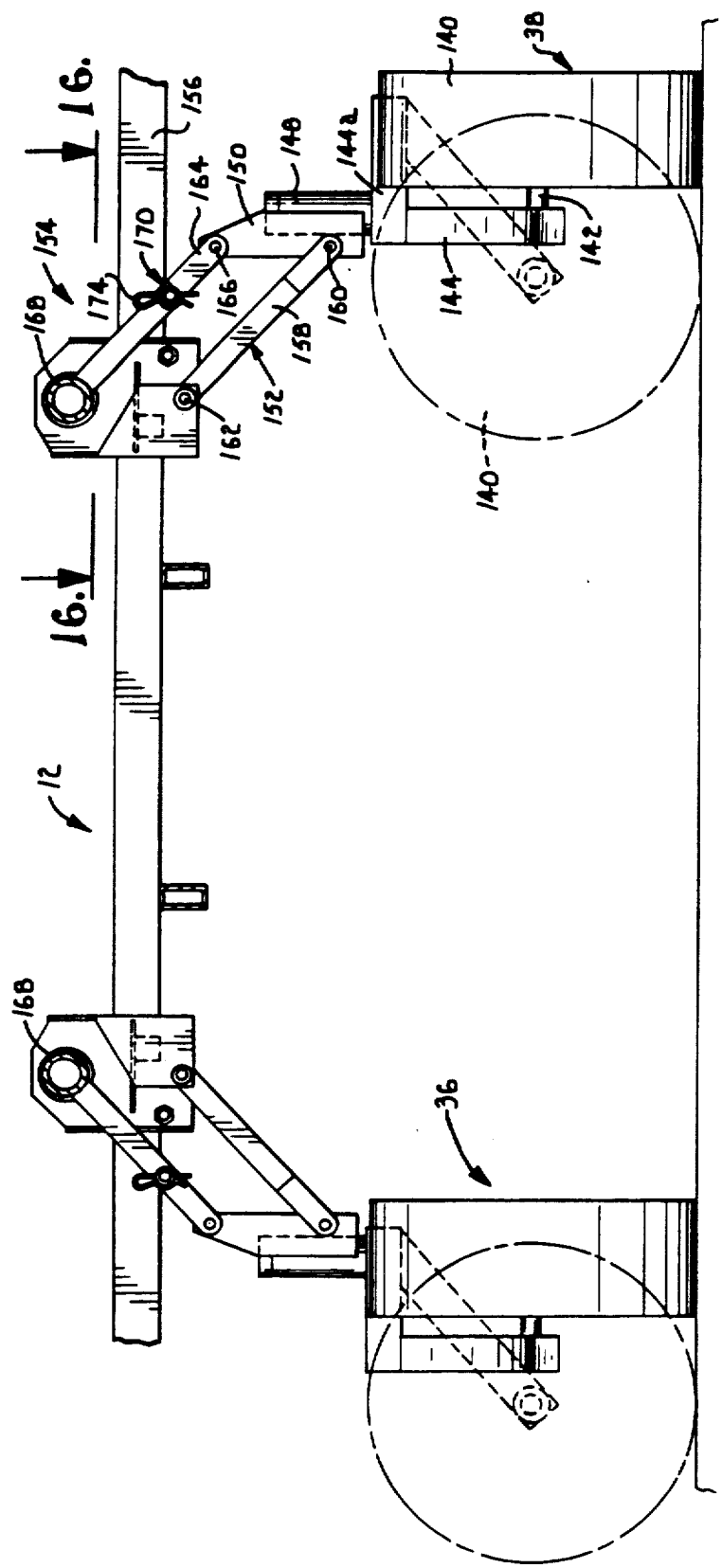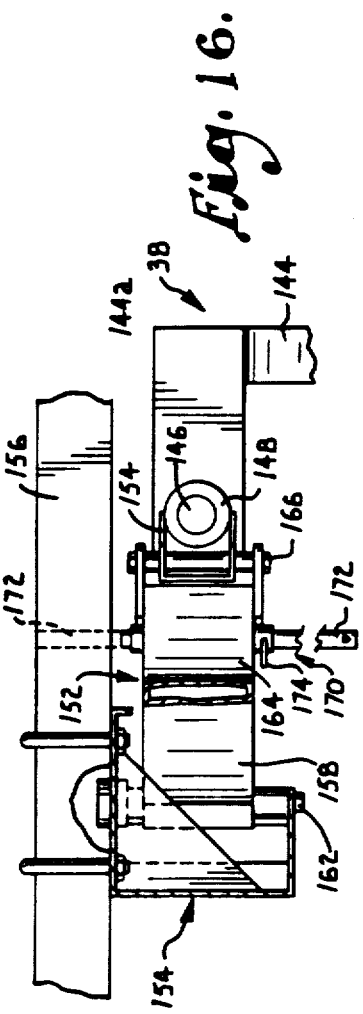

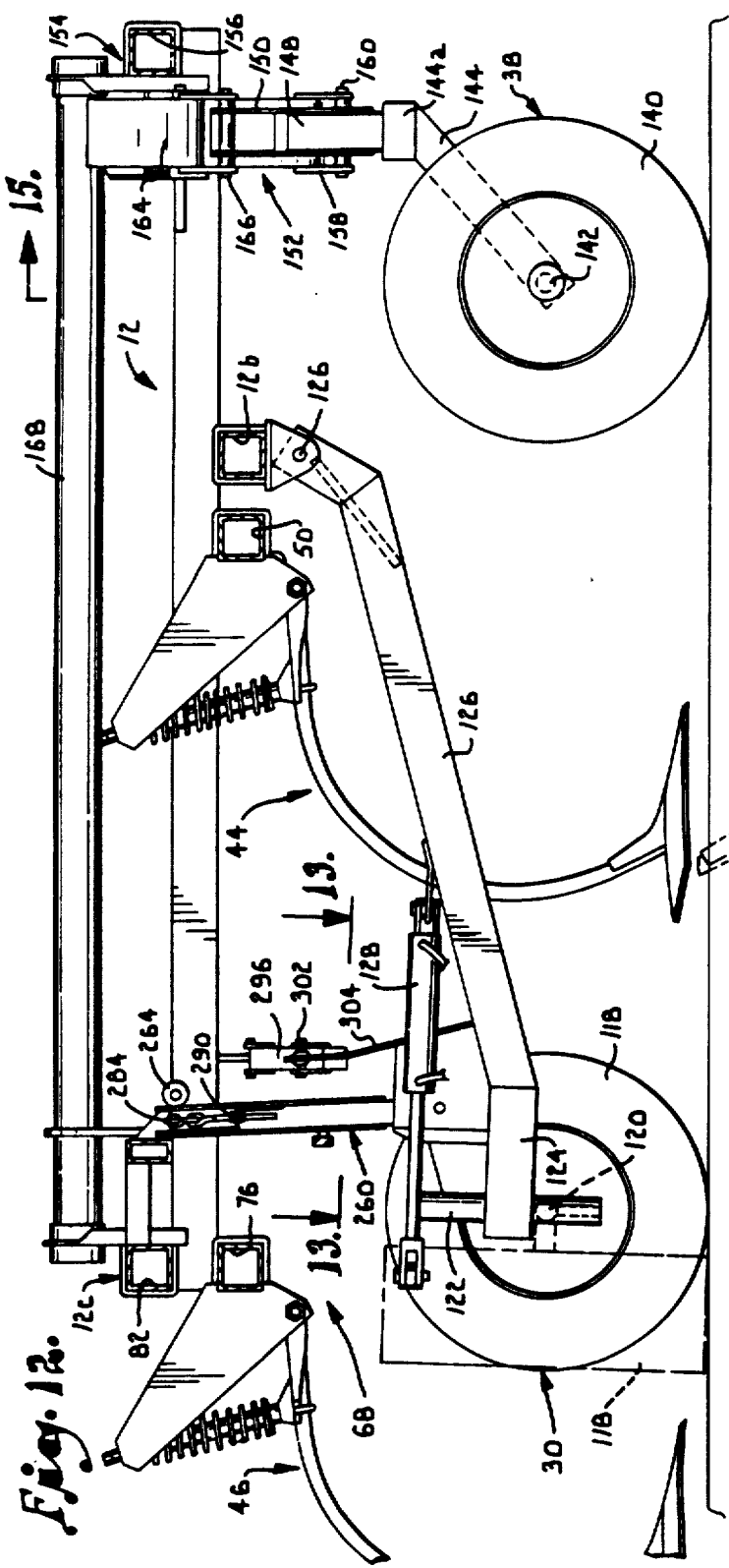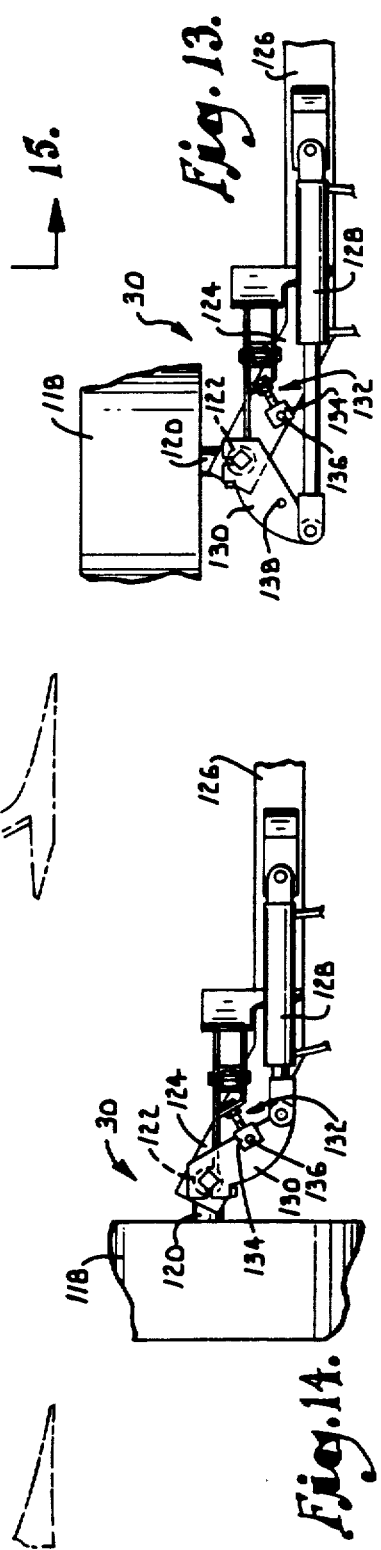

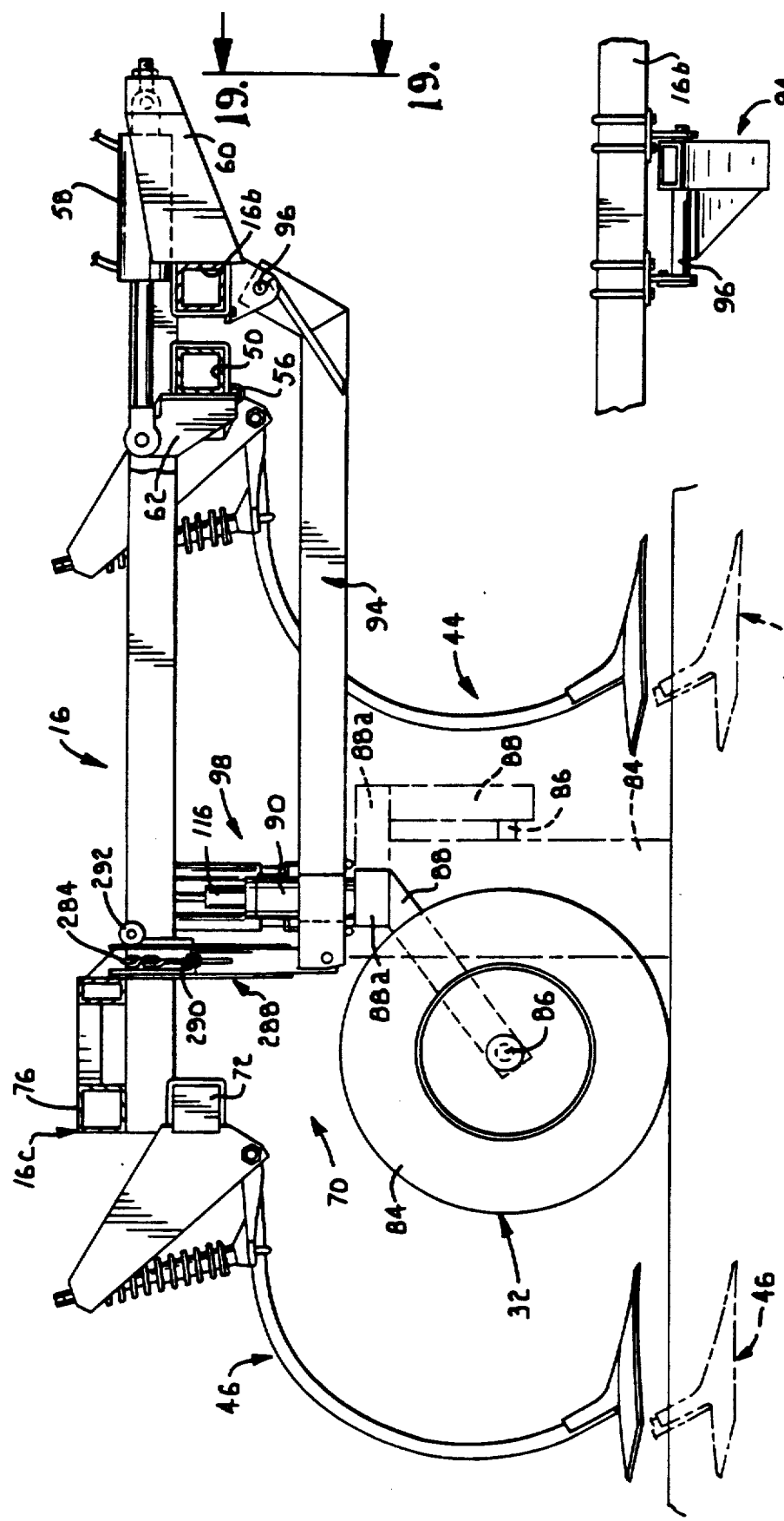

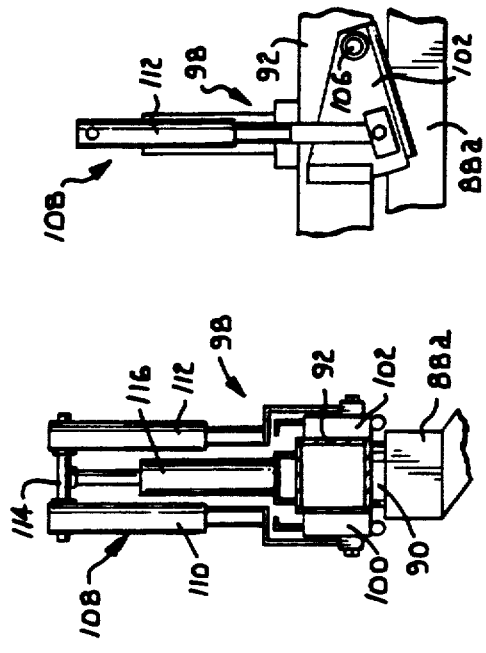
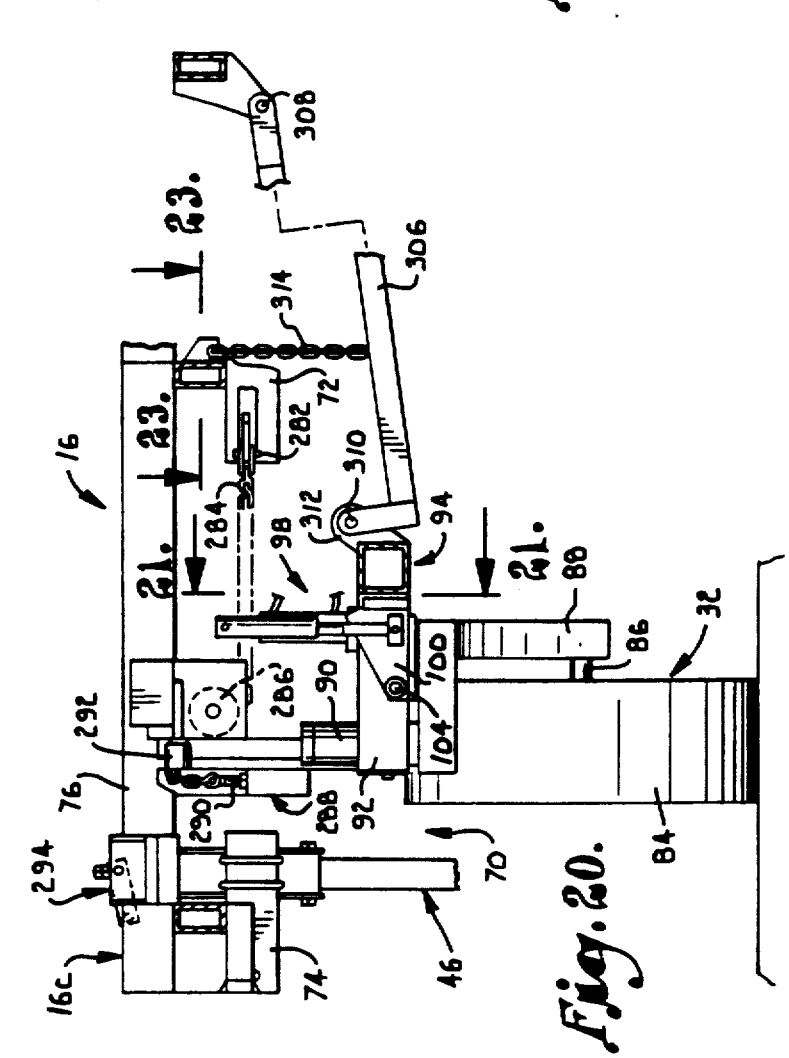
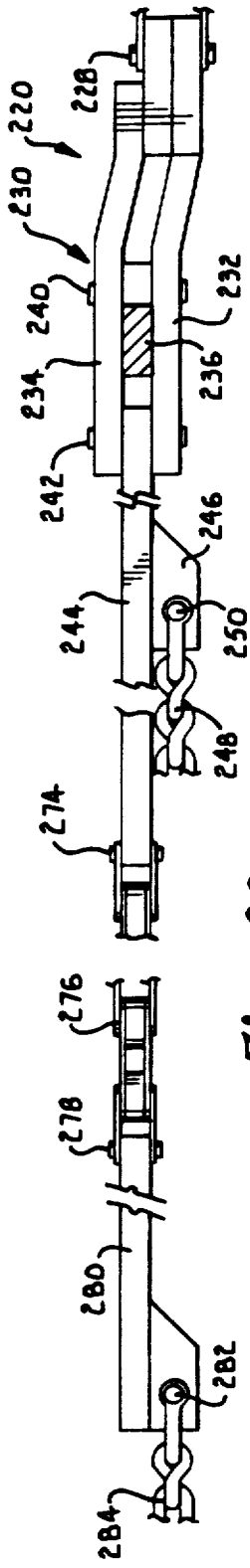

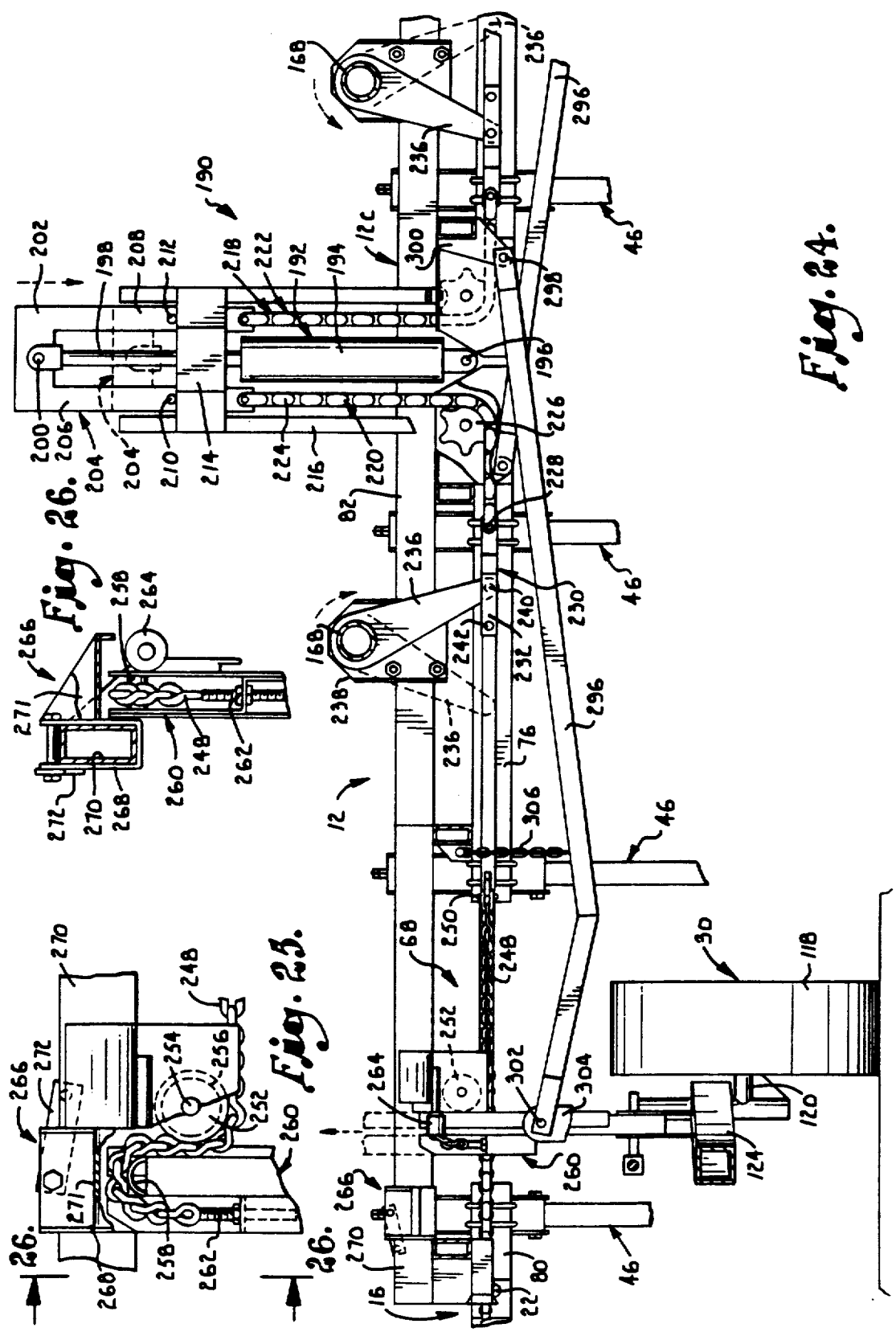

CONSERVATION TILLAGE IMPLEMENT CONVERTIBLE FOR END TRANSPORT

TECHNICAL FIELD

This invention relates to farm equipment such as tillage implements in which large, flat frames, which typically include a number of separate sections hinged together for accommodating changes in ground contour, are adapted to carry ground engageable tools and are provided with a front hitch that enables the machine to be coupled with a towing tractor

BACKGROUND AND SUMMARY OF THE INVENTION

Large towable farm implements, such as tillage machines, which have heretofore been available have a number of inherent shortcomings that provide opportunities for innovation. For example, one important object of the present invention is to provide a safe and secure way of adapting such an implement for end towing when the machine is to be transported down the road or otherwise through relatively narrow confines, without detracting from the effectiveness of the hitch of the implement when the implement is in its normal, field working position towed in a direction of travel that extends transversely of the longitudinal axis of the wide frame of the machine.

Another exemplary object of the present invention is to provide the end tow capability as aforesaid which is compatible with the ground wheel supporting system for the implement in normal field working position and does not interfere with the depth control function associated with the ground wheel system.

A further important object of the invention is to provide a unique depth control mechanism for tillage implements and the like which affords remote operation from the tractor seat, yet permits the use of but a single hydraulic control cylinder that is capable of regulating the height of a multiplicity of interconnected frames of the implement.

An additional important object of the invention is to provide a tillage implement having significantly improved anti-trash and residue collecting capabilities to avoid plugging and fouling of important mechanisms on the machine. In this respect, the present invention provides a novel design in which ground wheels of the implement are disposed immediately behind forwardly located tillage shanks of the machine so that the residue flow from such shanks tends to pass around and on by the wheel assemblies rather than be directed toward such assemblies for accumulation and buildup. Furthermore, the streamlined nature of the wheel supporting arms of the wheel assemblies encourages smooth trash flow from front to rear of the machine and provides little structure that would snag or catch the trash as it flows under the implement and to the rear thereof.

Still another important object of the invention is to provide improved floatation of a tillage implement through a frame construction that enables at least certain of the ground wheels to be located closer to tillage shanks of the unit than would otherwise be possible, thus permitting the shanks to encounter changes in terrain at essentially the same instant as the ground wheels themselves so that depth of penetration of the shanks can remain more constant than would otherwise be true.

Furthermore, an important feature of the present invention is to provide a tillage implement construction which permits a front row of the tillage shanks to be raised and lowered between operating and standby positions without interfering with the function and operation of a rearwardly disposed row of the shanks, thereby affording the farmer greater flexibility in determining the amount of tilling he desires for a particular field, the amount of crop residue that is to be left or turned under, and reducing the horsepower requirements at those times and under those conditions where such is desirable.

BRIEF DESCRIPTION OF THE DRAWINGS

FIG. 2 is a top plan view of the implement similar to FIG. 1 but showing the machine prepared for end towing with the hitch folded into a parallel condition with the longitudinal axis of the frame and the ground wheels swiveled into their roading positions also in line with the longitudinal axis of the frame, the phantom lines indicating an intermediate position of the hitch which occurs during swinging thereof from its field working position to its roading or transport position;

FIG. 3 is a rear elevational view of the implement in the transport position;

FIG. 4 is an enlarged, fragmentary top plan view of the central front portion of the implement showing the hitch in its folded transport position and illustrating details of construction;

FIG. 5 is an enlarged, fragmentary top plan view of the right front portion of the implement with the hitch folded into its transport, end tow position;

FIG. 6 is a fragmentary, transverse cross-sectional view of the folded hitch taken substantially along line 6—6 of FIG. 5;

FIG. 7 is a fragmentary, transverse cross-sectional view of the hitch in its folded condition taken substantially along line 7—7 of FIG. 5;

FIG. 8 is an enlarged, fragmentary front elevational view of the folded hitch taken substantially along line 8—8 of FIG. 4 and illustrating the manner in which one of the tow beams of the hitch is pivotally attached to the frame of the implement and is adapted for powered swinging during a portion of its movement from the transport position to the field working position;

FIG. 9 is a fragmentary, vertical cross-sectional view through the right front portion of the tillage frame and hitch taken substantially along line 9—9 of FIG. 4 and illustrating the pivotal connection between a second tow beam of the hitch and the main frame of the implement;

FIG. 10 is an enlarged, fragmentary end elevational view of the right end of the hitch and implement frame when the tongue is folded into its transport position illustrating a latching assembly for releasably retaining the hitch in its transport position;

FIG. 11 is a fragmentary front elevational view of a right front wheel on the implement frame taken substantially along line 11—11 of FIG. 10 and illustrating a hand crank mechanism for raising the wheel from the ground;

FIG. 12 is an enlarged, fragmentary transverse cross-sectional view through the implement taken substantially along line 12—12 of FIG. 1 with phantom lines indicating alternative positions of the ground wheel and the tillage tools;

FIG. 13 is a fragmentary, horizontal cross-sectional view through the ground wheel assembly of FIG. 12 taken substantially along line 13—13 of FIG. 12 and illustrating the ground wheel in its field working position;

FIG. 14 is a fragmentary, transverse, cross-sectional view similar to FIG. 13, but illustrating the ground wheel swiveled into its transport position for end tow of the implement;

FIG. 15 is a fragmentary, vertical cross-sectional view of the implement taken substantially along line 15—15 of FIG. 12 and illustrating the front ground wheels of the center frame section in disposition for field working, the phantom line positions of such wheels indicating their transport positions;

FIG. 16 is a fragmentary, horizontal cross-sectional view through one of the front ground wheel assemblies of the center frame section taken substantially along line 16—16 of FIG. 15 and illustrating details of construction of the wheel assembly;

FIG. 17 is a fragmentary, front elevational view of the wheel assembly illustrated in FIG. 16;

FIG. 18 is an enlarged, fragmentary transverse cross-sectional view of the implement taken substantially along line 18—18 of FIG. 1, the phantom lines illustrating alternative positions of the ground wheel and tillage shanks of the implement;

FIG. 19 is a fragmentary, elevational view of the wheel arm structure of the wheel in FIG. 18 and taken substantially along line 19—19 of FIG. 18;

FIG. 20 is an enlarged, fragmentary vertical cross-sectional view of the outboard ground wheel assembly of the implement taken substantially along line 20—20 of FIG. 1;

FIG. 21 is an enlarged, fragmentary vertical cross-sectional view of the outboard wheel assembly of FIG. 20 taken substantially along line 21—21 of FIG. 20;

FIG. 22 is a fragmentary, rear elevational view of the outboard wheel assembly of FIG. 20 illustrating how the wheel lock mechanism can be actuated to maintain the wheel in its straight ahead, ground working position;

FIG. 23 is a fragmentary, horizontal cross-sectional view at the rear of the implement taken substantially along line 23—23 of FIG. 20 and showing fragmentarily the depth or height control linkage which extends across the rear of the machine;

FIG. 24 is an enlarged, fragmentary, vertical cross-sectional view of the rear center section of the machine taken substantially along line 24—24 of FIG. 1 and illustrating details of construction of the depth or height control mechanism of the machine;

FIG. 25 is a further enlarged, fragmentary, elevational view of details of construction of the height control mechanism for the inboard ground wheel of FIG. 24 looking rearwardly as FIG. 24 is viewed;

FIG. 26 is a fragmentary, transverse, cross-sectional view of the mechanism illustrated in FIG. 25 and taken substantially along line 26—26 of FIG. 25;

FIG. 27 is an enlarged, fragmentary, transverse cross-sectional view of the front row of tillage shanks of the implement illustrating the front row in its upwardly rocked standby position; and FIG. 28 is a fragmentary, top plan view of the apparatus illustrated in FIG. 27 taken substantially along site line 28—28 of FIG. 27.

DETAILED DESCRIPTION

Figure 1:
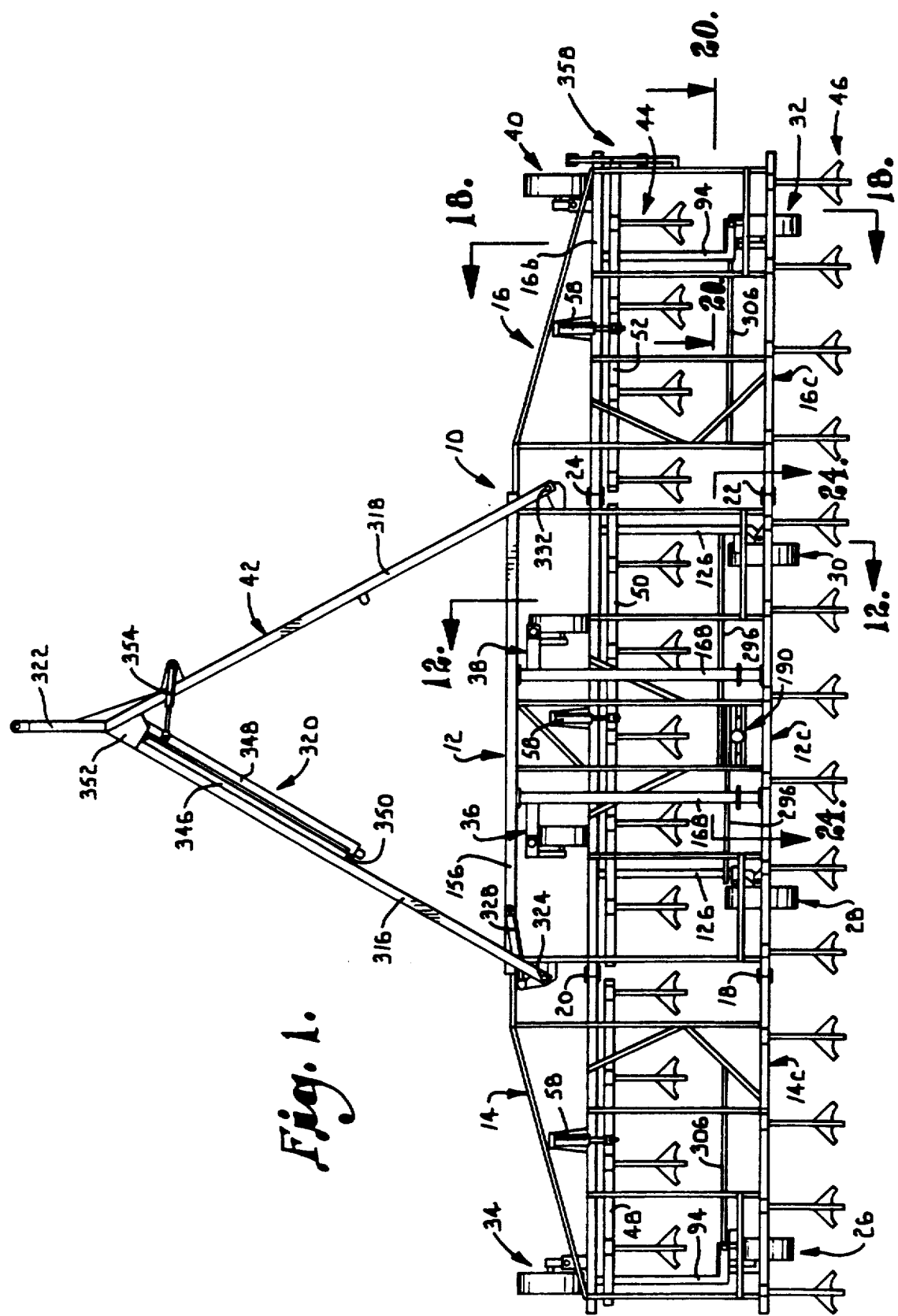
FIG. 1 is top plan view of a tillage implement embodying the principles of the present invention and shown in its field working position with the hitch positioned centrally of the machine and the line of draft extending transverse to the longitudinal axis of the wide tillage frame.

It will be appreciated from the description which follows that many of the principles of the present invention may be applied to a variety of farm implements. However, in preferred form and by way of example, a tillage implement of multi-section design has been selected for purposes of illustrating such broader principles.

As particularly illustrated in FIGS. 1, 2, and 3, the tillage implement includes an elongated frame 10 comprising a center section 12, a left wing section 14, and a right wing section 16. The left wing section 14 is hingedly connected to the center section 12 by hinges such as the hinges 18 and 20, while the right wing section 16 is hingedly connected to the center section 12 by hinges such as the hinges 22 and 24.

Additional frontmost hinges 21 and 23 may be seen in FIG. 4. The frame 10 is adapted for over-the-ground travel and support above the ground by a series of ground wheels including a left rear outboard ground wheel assembly 26 on the left frame section 14, a pair of rear ground wheel assemblies 28 and 30 on the center section 12, and a right rear outboard wheel assembly 32 on the right frame section 16. At the front of the frame 10, an outboard wheel assembly 34 is attached to the left frame section 14, a pair of center wheel assemblies 36 and 38 are secured to the center frame section 12, and a right outboard wheel assembly 40 is connected to the right wing section 16.

The implement also includes a special folding hitch broadly denoted by the numeral 42 which may be shifted between a working position, as illustrated in FIG. 1, in which the line of draft of the hitch 42 is transverse to the longitudinal axis of the frame 10 and a transport position, as illustrated in FIG. 2, wherein the hitch 42 is folded into a position in which the line of draft is generally parallel to the longitudinal axis of the frame 10. The implement is also provided with tillage tools supported on the frame 10, in the illustrated embodiment such tools broadly including a front row of shanks 44 and a rear row of shanks 46.

The shanks 44 in the front row are mounted on three separate, horizontally extending and end-to-end beams 48, 50 and 52, the beam 48 being carried by the left wing section 14, the beam 50 being carried by the center frame section 12, and the beam 52 being carried by the right wing section 16. Each of the beams 48, 50 and 52 is adapted to be rocked between a ground-engageable position, as illustrated in FIGS. 12 and 18, and an inoperable position, as illustrated in FIG. 27. All three of the beams 48, 50 and 52 are mounted in the same way to their respective frame sections and are actuated for movement between their working and inoperable positions in the same manner.

In this respect, certain fore-and-aft members of each of the frame dections 12, 14 and 16, such as the fore-and-aft member 12a in FIG. 27, are provided with short transverse stub beams 54 attached to the underside thereof for supporting the rockable shank beams 48, 50 or 52, as the case may be. A hinge 56 (FIGS. 18 and 27) carried by the stub beam 54 has a transverse pivot with respect to the working line of draft of the implement and is secured to the corresponding shank beam 48, 50 or 52 at a lower rear corner thereof, as illustrated in FIG.

27 and FIG. 18, so that such shank beams do not rotate about their longitudinal axes but rather about axes which are offset downwardly and to the rear of such longitudinal axes. Each of the shank beams 48,50 and 52 is mounted closely behind and parallel to a front transverse member of the corresponding frame section, such as the front transverse frame member 12b in FIG. 27. Each shank beam 48,50 and 52 has its own single, double-acting hydraulic piston and cylinder assembly 58 connected between a forwardly projecting mount 60 on the front transverse frame member and an upstanding crank 62 on the rear of the shank beam 48,50 or 52. The piston and cylinder assembly 58 provides the power for rocking the shank beam 48,50 or 52 between its alternate positions and for holding it in the inoperable position of FIG. 27. When the shank beam 48,50 or 52 is in its working position of FIGS. 12 and 18, the shank beam butts up against the underside of the corresponding frame section so as to resist rocking into the standby position.

The tillage shanks themselves may take a variety of forms well understood by those skilled in the art. In the illustrated embodiment, the shanks are in the nature of spring-cushioned chisel shanks provided with generally V-shaped sweeps at their lower ends, a number of such shanks being secured to and spaced along their corresponding beams 48,50 and 52. It will be noted that each of the shank beams 48,50 and 52 terminates just short of the corresponding fore-and-aft flex line of the frame 10 defined by the hinges 18,20 on the one hand, and hinges 22,24 on the other.

The rear row of shanks 46 is attached to the frame 10 at the same level as the front row of shanks 44 so that when the frame 10 is maintained in a level condition and is raised or lowered, all of the shanks are maintained at the same height. However, the rear transverse beam assemblies 14c, 12c, and 16c, are configured in what might be termed a "stepup, step-down" configuration to provide the proper mounting elevation for the rear shanks 46 but to also provide a set of rearwardly disposed clearance windows 64 (FIG. 3) (on the left wing section 14), 66 and 68 (on the center frame section 12) and 70 (on the right wing section 16). As will hereinafter be described in more detail, the clearance windows 64,66,68, and 70 provide vertical clearance for the rear ground wheels 26,28,30 and 32, respectively during the time that the frame 10 is raised and lowered. It is to be noted in this respect that when the rear wheels 26,28,30 and 32 are aligned in their working positions, as illustrated in FIG. 1, such rear wheels are in vertical alignment with the rear beam assemblies 14c, 12c, and 16c and are disposed within the corresponding windows 64,66,68 and 70.

The right rear beam assembly 16c, as shown perhaps best in FIG. 3, includes a long lower beam member 72 that extends rightwardly from the hinge 22 to the window 70 where it terminates. All the rear shanks of the right wing section 16 but one are mounted on the beam 72, the last rear shank of wing section 16 being mounted on a stub beam 74 situated on the opposite side of the window 70 from the beam member 72 and in axial alignment with the latter. In FIG. 18, the outboard end of the rear lower beam member 72 may be seen. As also shown in FIG. 18 and in FIG. 3, an upper transverse beam member 76 spans the window 70 across the top of the latter in vertical alignment with the beam member 72,74 and spaced a sufficient distance above the latter as to provide vertical clearance for the ground wheel assembly 32. It is to be understood that the top beam member 76 extends inwardly from the outboard end of the rear beam assembly 61c to a point approximately midway along the length of the latter before terminating. It will also be understood that the top beam member 76 is rigidly secured to fore-and-aft members of the wing section 16c overlying the rear beam members 72 and 74 so as to provide structural rigidity at that location. Thus, in the location of the window 70, the rear frame assembly 16c is "stepped up", while in the area where the rear shanks 46 are mounted on the rear beam assembly 16c, the latter is "stepped down" so that overhead clearance is provided for the ground wheel assembly 32 while the actual mounting points for the shanks 46 are maintained at a lower elevation corresponding to that of the front row of shanks 44.

The rear beam assembly 14c of left wing section 14 is the mirror image of the beam assembly 16c of right wing section 16. However, the rear beam assembly 12c of the center section 12 is slightly different than either of the beam assemblies 14c or 16c. In this respect, it is to be noted that all but two of the rear shanks on the center frame section 12 are mounted on a lower, central beam member 76 terminating at its left end at the right side of the window 66 and at its right end at the left side of the window 68. One of the remaining rear shanks 46 on center section 12 is mounted on a left stub beam 78 leading inwardly from the hinge 18 on the left side of the window 66 and axially aligned with the beam member 76, and the other remaining rear shank 46 on the center section 12 is mounted on a right stub beam 80 extending inwardly from the hinge 22 to the window 68 and aligned both vertically and horizontally with the center beam member 76. A single upper beam member 82 is spaced above the beam member 76,78, and 80 in vertical registration with the same to provide a top limit to the windows 66 and 68. The top beam 82 is rigidly affixed to certain fore-and-aft frame members of the center section 12 which are in turn rigidly secured to the lower beam members 76,78, and 80 to provided structural rigidity at that location. The step-up, step-down feature is also illustrated in part in FIG. 12. Thus, like the rear beam assemblies 14c and 16c of the wing sections 14 and 16, the rear beam assembly 12c of the center section 12 is stepped-up in the area of the windows 66 and 68 to provided clearance for the ground wheels 28 and 30, while it is stepped-down in the shank supporting areas thereof so as to maintain the rear row of shanks 46 supported at the same level as those rear shanks 46 on the wing sections 14,16 and as the front row of shanks 44 across the entire front of the frame 10.

The wheel assemblies 26 and 32 of the wing sections 14 and 16, respectively, are identical in construction to one another except for being mirror images of one another. Accordingly, only the wheel assembly 32 will be described in detail, it being understood that the description of wheel assembly 32 applies to wheel assembly 26 as well. The wheel assembly 32 includes a ground wheel 84 having a horizontal axle 86 carried by a caster bracket 88 having an upright spindle 90. The spindle 90 is carried adjacent the outer end of the short, transversely extending leg 92 of a generally L-shaped, fore-and-aft extending wheel arm 94 having a transverse, horizontal pivot 96 at its forwardmost end with the front transverse beam member 16b of wing section 16, as illustrated in FIGS. 18 and 19. Thus, the wheel arm 94 is adapted for vertical swinging movement relative to the wing section 16 about the horizontal pivot 96.

The wheel assembly 32, which includes the wheel 84, axle 86, caster bracket 88, and spindle 90, is free to swivel about the upright axis of spindle 90 in reaction to changes in the line of draft of the implement which occur during folding and unfolding of the hitch 42 between transport and working positions, as will hereinafter be described in detail. However, when the wheel assembly 32 is in its working position extending transversely of the longitudinal axis of the frame 10, as illustrated in FIG. 1, the wheel assembly 32 is releasably locked in such position by a lock assembly broadly denoted by the numeral 98 and shown principally in FIGS. 20, 21, and 22. The lock assembly 98 includes a pair of generally triangular plates 100 and 102 pivotally secured by independent pivots 104 and 106, respectively, to opposite foreand-aft sides of the leg 92 of wheel arm 94. When the two plates 100,102 are in their raised positions of FIGS. 20 and 21, the wheel assembly 32 is unlocked, but when the plates 100,102 are in their lowered position of FIG. 22, such plates embrace not only the leg 92 but also a horizontal member 88a of the caster bracket 88 so as to effectively lock the caster bracket 88 against pivoting movement relative to the wheel arm leg 92.

In order to control the positions of the locking plates 100,102 and to actuate them in unison, such plates 100,102 are interconnected via an inverted U-shaped bracket 108 having upright legs 110 and 112, respectively, connected pivotally to the plates 100,102, and a bight 114 that securely interconnects the legs 110,112 adjacent their upper end. A double acting, upright piston and cylinder assembly 116 projects upwardly from the top of the leg 92 and joins with the bracket 108 at the bight 114 thereof to raise and lower the bracket 108 between the alternative position, as illustrated in FIGS. 21 and 22, whereby to unlock and lock the caster bracket 88 in the earlier described manner.

Turning to the construction of the wheel assemblies 28 and 30 of the center frame section 12, it will be noted that such two wheel assemblies are identical one to another. Thus, only details of construction of the right wheel assembly 30 will be described at length, it being understood that the explanation of the construction of the wheel assembly 30 applies to the wheel assembly 28 as well.

As illustrated primarily in FIGS. 12, 13, and 14, the wheel assembly 30 includes a ground wheel 118 provided with a horizontal axle 120 coupled in a known manner with an upright spindle 122. The spindle 122 is, in turn, supported for swiveling movement about its upright axis by the inturned, diagonally extending leg 124 of a generally fore-and-aft extending, long wheel arm 126 that angles upwardly and forwardly from the leg 124 to a horizontal pivot 126 with the front transverse beam 12b. The spindle 122 permits the wheel 118 to be rotated about the axis of spindle 122 between the straight-ahead working position shown in solid line in FIG. 12 in which the wheel 118 rolls transversely of the longitudinal axis of the frame 10 and a transport position shown in phantom lines in FIG. 12 in which the wheel 118 rolls generally parallel to the longitudinal axis of frame 10. As shown in the plan view in FIG. 1, the diagonal offset of the leg 124 enables the wheel 118 to be positioned almost directly behind a forwardly disposed shank 44 when the wheel 118 is in its straight ahead working position of FIG. 1.

The wheel assembly 30, which includes the wheel 118, the axle 120, and the spindle 122, is adapted for powered swinging between its two alternative positions by a double acting hydraulic piston and cylinder assembly 128 coupled at one end with the wheel arm 126 and at the other end with a crank 130 fixed to the upper end of the spindle 122. Thus, extension and retraction of the piston and cylinder assembly 182 turns the wheel assembly 30 between its two alternative positions via the crank 130 as it swivels the spindle 122 about its upright axis. The wheel assembly 30 may be locked in its transport position by a retainer 132 (FIG. 13 and 14) comprising a small clevis 134 supported by the arm 126 in such a position as to embrace the crank 130 on opposite upper and lower sides thereof when the latter is in its FIG. 14 position, which brings a pinhole 136 of the clevis 134 into vertical registration with a corresponding hole 138 on the crank 130. A locking pin (not shown) may then be removably inserted into the aligned holes 136,138 to mechanically hold the wheel assembly 30 in the transport position.

The front wheel assemblies 34,36,38 and 40 are mounted on the frame 10 in a considerably different manner than the rear wheel assemblies 28,26,28, 30, and 32. However, generally speaking, the two wheel assemblies 36 and 38 of the center frame section are mounted in a manner to always support the load of the frame 10 during ground working or transport and are swingably secured to the frame 10 to provide depth control adjustment. On the other hand, the two outboard wheel assemblies 34 and 40 are merely gauge wheels, and while they support the load of the frame 10 at the left and right corners thereof during field operations, they are not designed to be remotely adjustable from the tractor seat via hydraulics for depth adjustment purposes, nor are they intended to support the load of the frame 10 during transport.

Referring initially to FIG. 15, it will be seen that each of the wheel assemblies 36,38 includes a ground wheel 140 having a horizontal axle 142 which is carried at the lower end of a caster bracket 144. A horizontal bar 144a of the caster bracket 144 adjacent the top end thereof has an upright spindle 146 (FIG. 16) which is mounted for swiveling movement within a cylinder 148 contained in upright position by a generally transversely U-shaped, upright bracket 150. The bracket 150, in turn, is supported by a parallel, four-bar linkage 152 to a support box assembly 154 that is, in turn, rigidly affixed to a main crossbeam 156 of the center frame section 12.

The four-bar linkage 152 includes a lower link 158 coupled via a transverse pivot 160 at its lower end to the lower end of the upright bracket 150, and coupled via a transverse pivot 162 at its upper end to the mounting box 154. Similarly, the upper link 164 of the four-bar linkage 152 is pivotally coupled at its lower end to the upper end of bracket 150 by a transverse pivot 166 and is fixedly connected in a crank-like manner at its upper end to a torque tube 168 which runs across the top of the center frame section 12 from front to rear thereof for depth control purposes, as will hereinafter be explained in detail. The torque tube 168 is journaled by the upper end of the mounting box 154 for rotation of the torque tube 168 about its longitudinal axis.

The wheel assembly 36, including the wheel 140, the axle 142, the caster bracket 144, and the spindle 146 is free to caster about the vertical axis of the spindle 146 in response to changes in the line of draft of the implement occurring as a result of shifting of the hitch 42 from its working to transport positions and vice versa. Additionally, the vertical relationship between the center frame section 12 and the wheel assembly 36, and thus the depth of the shanks 144 either into the ground or above the ground, is controlled by the swingable position of the four-bar linkage 152, which is, in turn, controlled by the rotative position of the torque tube 168 as will be explained.

A mechanical lock 170 is provided on the four-bar linkage 152 for releasably locking the wheel assembly 36 or 38 in a position corresponding to a fully raised position of the frame 10. The lock 170 comprises a load bearing cross pin 172 carried by the upper link 164 and shiftable transversely thereof between a retracted position, as illustrated in solid lines in FIG. 16, and an extended position shown in phantom lines in FIG. 16 in which it underlies the beam 156 to prevent the latter from falling down below the pin 172. A cotter key 174 may be inserted into suitable holes associated with the locking pin 172 to releasably retain the latter in either its extended or retracted positions.

As is apparent, FIG. 15 shows both of the wheel assemblies 36,38 fully extended relative to the center frame section 12. On the other hand, FIG. 17 illustrates the wheel assembly 38, for example, in such a position that the frame section 12 is lowered with respect thereto.

The nature and construction of the left and right gauge wheels 34 and 40 is perhaps best illustrated in FIGS. 10 and 11, using the gauge wheel 40 as an example. It will be understood that because of the similarity in construction between the gauge wheels 34 and 40, only the wheel assembly 40 will be described in detail.

The wheel assembly 40 includes a ground wheel 176 having a horizontal axle 178 that is secured to a downwardly and forwardly extending diagonal wheel arm 180. The upper end of the wheel arm 180 is secured via a transverse pivot 182 to a downwardly extending bracket 184 that is fixedly secured at its upper end to the transverse beam 16b of the wing section 16. A mechanical jack 186 having a handle 188 is connected between the bracket 184 and the wheel arm 180 for the purpose of mechanically swinging the wheel arm up and down for raising or lowering the wheel 176 between selected positions of height adjustment. There is no castering of the wheel assembly 40, the wheel 176 always being disposed in a straight forward position transverse to the longitudinal axis of the frame 10.

The mechanism for controlling the height of the frame 10 above the ground, and thus the depth of the shanks 44 and 46, is shown to its largest extent in FIGS. 23,24,25, and 26. As shown in FIG. 24, such mechanism is denoted broadly by the numeral 190 and includes as its primary actuating component an upright, double-acting piston and cylinder assembly 192 located adjacent the central rear of the center frame section 12. The cylinder 194 of the assembly 192 has a pivotal connection 196 at its lower end with the beam 82, and the extensible rod 198 of the assembly 192 has a connection 200 at its upper end with the bite 202 of an inverted U-shaped slide 204 reciprocable between the upper solid line position in FIG. 24 and the lower phantom line position. In the upper solid line position of the slide 204, the frame 10 is fully raised, while in the phantom line position, it is lowered to the desired working depth.

The slide 204 has a pair of downwardly extending legs 206 and 208 that straddle the rod 198 of piston and cylinder assembly 192. Cross pins 210 and 212 are insertable within the legs 206 and 208 at the indicated locations to serve as removable safety locks by bearing against the upper edge of a stationary crossbar 214 when the slide 204 is fully raised. A corresponding crossbar 214 (not shown) is provided on the back side of the machine to assist in the holding of the slide 204 in its elevated position when the safety pins 210 and 212 are installed.

The depth control mechanism 190 further includes an upright guide track 216 for the slide 204 to confine the latter during its vertical reciprocation, the guide track 216 being rigidly secured to and projecting upwardly from components rigidly affixed to the center frame section 12.

The mechanism 190 further includes structure that may broadly be described as flexible linkage 218 interconnecting the cylinder assembly 192 via the slide 204 with the rear ground wheel assemblies 26–32 for causing raising and lowering of the frame 10. Such linkage 218 includes two major lengths 220 and 222, the right length 220 being connected to a lower end of the leg 206 of slide 204 and the left link 222 being connected with the lower end of the leg 208 of the slide 204. As will be seen, each of the linkage lengths 220,222 is comprised of a combination of chains and solid links for transmitting the appropriate motions and supporting loads.

In this respect, using the length 220 as an example, it will be seen viewing FIG. 24 that the length 220 at its inboard end includes a roller chain 224 which is looped under a idler sprocket 226 secured to structural components of the frame section 12. The chain 224 continues on around the idler 226 in the outboard direction and has a pivotal connection 228 at its outboard end with a relatively short link assembly 230 (see also FIG. 23) having front and rear links 232 and 234. The two links 232 and 234 are spaced apart front to rear and capture therebetween a long crank 236 which extends upwardly therefrom to the torque tube 168 journaled at the rear by the upright support 238 on beam 82. A pivot pin 240 extends front to rear through the links 232,234 and the lower end of crank 236 to connect the latter with the right length 220 of the flexible linkage 218.

At its outboard end, the short link assembly 230 has a pivot connection 242 with a longer, single horizontally extending link 244 which extends along in front of the beam 76 until reaching the vicinity of the ground wheel assembly. Inboard of the ground wheel assembly 30, the single link 244 is provided with a mounting ear 246 on the front side thereof which serves as a connection point for a link chain 248 having a connection 250 with the ear 246. As will be seen, the link chain 248 is used to control the ground wheel assembly 30, while the link 244 and its subsequent associated components are used to control the outer wheel assembly 32.

As illustrated particularly in FIG. 25, but also in FIGS. 24 and 26, the link chain 248 adjacent its outer end is looped under a sheave 252 which is rotatably secured to mounting structure associated with the beam 82 by a fore-and-aft extending pivot 254. As will be seen, the sheave 252 serves as purchase means for obtaining a mechanical advantage on the frame 10 as it seeks by gravity to lower itself toward the ground.

The sheave 252 has a grooved periphery 256 which receives and confines the link chain 248 against fore-and-aft displacement away from the control of the sheave 252. After leaving the sheave 252, the link chain 248 passes upwardly and is looped around and down past a stationary upper rounded end 258 of an upright post 260 secured at its lower end to the wheel arm 126. At its outermost end, the chain 248 has an anchor 262 with the post 260 after the chain 248 has passed over the rounded upper end 258.

The post 260 is adapted to reciprocate vertically as the wheel arm 126 swings up and down about the front pivot 126 (see also FIG. 12). A front transverse roller 264 mounted on the frame section 12 on the forward side of the post 260 guides the latter during its vertical reciprocation, which reciprocation is also guided by the confinement of the link chain 248 within the peripheral groove 256 of the sheave 252.

As shown best in FIGS. 24, 25 and 26, a safety lock 266 may be utilized to keep the post 260 fully extended and the frame section 12 thus fully raised. Such lock 266 includes a slide 268 wrapped around the transverse beam 270 and slidable along the latter between an inoperative position shown in solid lines in FIG. 24 and an operative position overlying the post 260 and shown in solid lines in FIGS. 25 and 26. A forwardly projecting overhang 271 on the slide 268 blocks vertical movement of the post 260 when the lock is in its locking position of FIGS. 25 and 26. A suitable latch 272 on the rear of the slide 268 may be pinned to the beam 270 when the slide 268 is in its locking position so as to releasably retain the slide 268 in such position.

Referring back to FIG. 23, it will be seen that at the outer end of the single link 244, a pivot 274 connects the link 244 with a section of roller chain 276. The roller chain 276 extends outwardly beyond the wheel assembly 30 and the hinge 22 so as to provide flexibility for the depth control linkage as the outer wing section 16 swings up and down relative to the center frame section 12. Then, the roller chain 26 has a pivot connection 278 at its outer end with a solid link 280 which extends further outwardly into the vicinity of the outer window 70 for outboard wheel assembly, as illustrated in FIG. 20. A pivot connection 282 at the outer end of the solid link 280 couples the latter with a link chain 284 which extends outboard to purchase means for the wings section 16 in the nature of a sheave 286. The sheave 286 is similar in construction and function to the sheave 252, and the link chain 284 which is looped under the sheave 286 passes upwardly therefrom and is looped around the upper end of post 288 rising upwardly from the rear end of wheel arm 94 (see also FIG. 18). Chain 284 has an anchor 290 on the post 288 similar to the anchor 262 on post 260, and a guide roller 292 confines and bears against the post 288 in the same manner as the guide roller 264 with the post 260. A slide safety lock 294 similar to the safety lock 266 may be selectively placed in overlying relationship to the post 288 when the wing section 66 is fully raised whereby to prevent accidental lowering of the frame section 16.

Thus, it will be seen that actuation of the hydraulic cylinder assembly 192 is transmitted to the rear wheel assemblies 26,28,30, and 32 via the flexible linkage lengths 220 and 222. In addition, such linear displacement of the linkage lengths 220 and 222 is transmitted to the front wheel assemblies 36 and 38 via the cranks 236, the torque tubes 168, and the four-bar linkages 152.

It will be appreciated that the long wheel arms 94 and 126 for the outboard rear wheels 26,32, and 28,30, respectively, may be subject to lateral loading, particularly as the frame 10 undergoes end towing after the wheel assemblies 26,28,30, and 32 have been swiveled into their transport positions. Thus, as shown in FIGS. 12 and 24, for example, with respect to the wheel assembly 30, each of the wheel assemblies 28,30 is provided with a long stiffening strut 296 having a pivot connection 298 at its inboard end with a depending lug 300 fixed to the center frame section 12. The stiffening strut 296 extends outwardly to an outer pivotal connection 302 with an upstanding lug 304 on the wheel arm 126 generally adjacent the rear portions thereof. A chain 306 is hooked between the frame section 12 and the stiffening strut 296 to limit the extent of downward travel of the strut 296, thus assuring that the post 260 associated with the wheel assembly 30 cannot slip downwardly past the guide roller 264 and thus out of operative position in the event the frame section 12 is somehow maintained in an elevated position while the ground surface beneath the wheel assembly 30 drops away. Thus, in an indirect way, the chain 306 serves as a lower limit for reciprocation of the post 260 associated with the wheel assembly 30.

A similar structural stabilizing arrangement is utilized in connection with the outboard wheel assemblies 26 and 32 as illustrated, for example, in FIG. 20 with respect to the wheel assembly 32. There, it will be noted that a stiffening strut 306 has a pivot connection 308 at its inboard end with the wing section 16 and a pivot connection 310 at its outboard end with a lug 312 fixed to the wheel arm 94. A chain 314 connects between the wing section 16 and the strut 306 to serve as a lower limit of reciprocation for the post 288 of wheel assembly 32 in the same manner as the chain 314 with respect to the wheel assembly 30.

The hitch 42 broadly comprises a pair of left and right tow beams 316 and 318 and a folding linkage 320 therebetween. As illustrated in FIG. 1, the tow beams 316 and 318 converge forwardly toward a coupling 322 on the right tow beam 318 when hitch 42 is in its working position, whereas the tow beams 316 and 318 lie generally parallel to the longitudinal axis of the frame 10, as shown in FIG. 2, when the implement is in its transport position.

The rear pivot location for the left tow beam 316 is behind the front most cross beam 156 of the center section 12 and is substantially below the level of beam 156. Viewing FIGS. 4 and 8, for example, it will be seen that the pivot 324 for the left tow beam 316 (which is essentially a ball joint pivot to provide up and down movement of the tow beam 316 as well as left and right horizontal swinging thereof) is located substantially below the front beam 156 and behind the latter. This elevational relationship is also illustrated in FIG. 3. Preferably, the pivot 324 is at generally the same height as the front end of the coupling 322 where the latter hitches to a towing vehicle so the line of force from the towing vehicle is at a relatively low level where it is transmitted to the frame 10.

The pivot 324 for the left tow beam 316 is at the bottom end of an upright leg 326 of the tow beam 316 which enables the latter to be arched up and over the front beam 156 of center frame section 12. A double acting piston and cylinder assembly 328 lies at an angle between a crank 330 on the upright leg 326 and a bracket 332 on the beam 156. As will hereinafter be made clear, the cylinder 328 is useful in helping to initiate unfolding of the hitch 42 from its transport position to its working position.

The right tow beam 318 is pivoted to the center frame section 12 in a manner similar to the left tow beam 316. As illustrated in FIGS. 1, 4, and 9, the pivot 332 of right tow beam 318 is also located behind the forwardmost beam 156 and substantially below the same at a level corresponding to that of the pivot 324 for the left tow beam 316. The pivot joint 332 is also in the nature of essentially a ball and socket joint permitting not only left and right horizontal swinging of the tow beam 318, but also up and down swinging thereof so that the hitch 42 is flexibly connected to the frame 12 to accommodate substantial changes in ground contour which may be experienced by the towing vehicle on the one hand and the trailing frame 10 on the other.

As with the left tow beam 316, the right tow beam 318 has an upright leg 334 having the pivot 332 at the bottom thereof, thus affording the right tow beam 318 an arched configuration such that the beam 318 is arched upwardly and over the front cross beam 156 to clear the latter in all motions of the hitch 42 from side to side and from up and down positions.

In order to control the extent of flexing of the hitch 42 relative to the frame 10 about a horizontal axis through the special pivots 324 and 332, the rear of the tow beam 318 is provided with limit apparatus broadly denoted by the numeral 336. Such apparatus 336 includes an upright post 338 extending from a point adjacent the pivot 332, as shown in FIG. 9, to a point just below the horizontal arched portion of the tow beam 318. The upper end of the post 338 is received within an open bottom housing 340 that is fixed to the tow beam 318 adjacent the rear thereof and includes a portion 342 extending parallel to the beam 318 and an offset portion 344 extending beyond the end of beam 318. In the folded position of FIG. 4, it will be seen that the post 38 has only limited space within the housing 30 in a fore-and-aft sense such that there is little flexibility of the hitch 42 relative to the frame 10 when the hitch 42 is in the transport position. On the other hand, when the tow beam 318 is swung around to its forwardly projecting position with the hitch 42 in its working position of FIG. 1, the length dimension of the housing 340, including the offset portion 344, provides a significant amount of space for relative movement in a linear sense between the housing 340 and the post 338, thus allowing significant flexibility of the hitch 42 relative to the frame 10 at that time.

The linkage 320 between the two tow beams 316 and 318 includes a first link 346, a second link 348, and an elbow joint 350 therebetween. The first link 346 is approximately one-half as long as the horizontal portion of left tow beam 316 and is pivotally connected to the latter adjacent its forward end but set back slightly therefrom to provide an extended portion 316a of tow beam 316 which fits into a receiving socket 352 at the front end of tow beam 318 when the hitch 42 is in its working position of FIG. 1. In such working position, the linkage 320 is fully collapsed and is forced over against the left tow beam 316 by a pair of upper and lower hydraulic cylinder assemblies 354 shown in detail in FIGS. 5 and 6 as well as schematically in FIGS. 1 and 2. The two cylinders 354 are connected at one end to the right tow beam 318 and at their opposite ends to the link 348 of linkage 320.

The front end of the link 348 is pivotally connected to the right tow beam 318 via a vertical pivot 356 associated with the socket 352. Correspondingly, the other link 346 is pivotally connected to the left tow beam 316 via a gimble 358 to provide not only for pivoting in a horizontal plane, but also a degree of vertical flexing action.

It should be noted that when the cylinders 354 are extended and the hitch 42 is in the working position of FIG. 1, the hitch 42 is locked in position against being unfolded inasmuch as the extension 316a of the left tow beam 316 is received within the socket 352 and the linkage 320 is hydraulically held against the left tow beam 316 to prevent unfolding. On the other hand, when the cylinders are retracted, as illustrated in the phantom view in FIG. 2, with the hitch 42 in an intermediate position during transfer between transport position and field working position, the linkage 320 may unfold about its elbow joint 350.

When the hitch 42 is in its transport position of FIG. 2, it may be held in such position by a special latch shown in detail in FIG. 10 and schematically in FIGS. 1 and 2. Such latch 358 is located at the outboard end of the right wing section 16 and includes, among other things, a pair of upright members 360 and 362 which are positionable on opposite fore-and-aft sides of the tow beam 318 and the adjacent link member 348 to confine such structures therebetween. The upright member 360 is pivoted to the wing section 16 via a horizontal pivot 364, while the upright member 362 is pivoted by a horizontal pivot 366 to the wing section 16 forwardly of pivot 364. A releasably swingable retainer 367 at the upper ends of the upright members 360 and 362 holds the two in their upright dispositions when retaining the hitch 42 in its transport position.

When the hitch 42 is not in its transport position, the members 360 and 360 of the latch 358 may be swung down into stored positions as shown in phantom lines in FIG. 10. In this respect, it will be noted that a diagonal brace 368 keeps the member 360 in an upright position during a latching action; however, an upper pin 370 between the brace 368 and the upright member 360 may be pulled after use of the latch 358 is no longer required, permitting the brace 368 to pivot downwardly about a pivotal connection 372 into its horizontal stored position. Thereupon, the upright member 360 can, likewise, be swung down into its horizontal stored position, as can the upright 362 once the tow beam 318 and link 348 are no longer in their transport positions.

OPERATION

In normal field operations the implement is in the condition illustrated in FIG. 1 in which the coupling 322 of the hitch 42 is situated symmetrically with respect to the two opposite ends of the frame 10, i.e., equi-distant between such opposite ends. All of the ground wheels 26,28,30,32,34,36,38, and 40 are aligned parallel with the line of draft through the hitch 42 that is transverse to the longitudinal axis of the frame 10. The elbow linkage 320 is forced over against the left tow beam 316 by the hydraulic cylinders 354, thus preventing the hitch 42 from unfolding.

As the machine is advanced, the depth of penetration of the shanks 44 and 46 is determined by the extent to which the frame 10 is lowered toward the ground wheels. This is controlled by the control mechanism 190 at the rear of the machine utilizing but a single hydraulic cylinder 192.

As the cylinder 192 is collapsed, the lengths 220 and 222 of the flexible linkage 218 are allowed to pay out such that the link chains 248 are displaced linearly under and up the outside of their sheaves 52 to in effect provide slack in the chains 248 sufficient to allow the posts 260 of the inboard rear wheel assemblies 28 and 30 to rise. This, of course, assumes that the safety slides 266 have first been removed to their standby positions. Likewise, the chains 284 associated with the outboard wheel assemblies 26 and 32 move around and up the far sides of their sheaves 286, providing slack for the posts 288 of the outboard wheel assemblies 26 and 32 to rise as well. Since the cranks 236 associated with torque tubes 168 have also been angularly displaced an amount corresponding to the linear displacement of the flexible linkage lengths 220 and 222, the torque tubes 168 cause the front ground wheel assemblies 36 and 38 to be operated via the four-bar linkages 152 to allow the frame to lower. Preferably, the outer front gauge wheels 34 and 40 have been preset at such a height that they engage the ground when the frame has been lowered to its desired position without requiring further adjustment.

As the machine moves through the field and tillage operations occur, it will be seen that the trash flow from the front row of shanks 44 is such as to bypass the trailing rear wheel assemblies 26,28,30 and 32. That is to say, because the rear wheel assemblies 26–32 are aligned directly behind certain of the forward shanks 44, the trash flow tends to be outwardly and in opposite directions somewhat in the nature of a wake to flow away from such wheels rather than directly into the path of travel of the oncoming wheels. Thus, the accumulation and plugging caused by trash and residue on previous machines in the area of the ground wheels can be substantially reduced, if not entirely avoided, in the present design.

Helpful in this respect is the fact that the wheel arms 26 and 94 for the rear wheel assemblies are long and streamlined without any abrupt corners or obstructions that would cause the accumulation of residue and trash materials. With the rear wheels positioned totally at the rear of the machine, a long fore-and-aft dimension is available for the wheel arms 94 and 26 allowing them to be sloped gently upwardly and forwardly to facilitate trash and residue flow.

It will also be appreciated that positioning the rear ground wheel assemblies 26–32 far to the rear of the machine as in the present invention greatly enhances the ground following ability of the machine and its ability to keep the rear shanks 46 at a constant depth of penetration into the ground. By having the rear wheels 26–32 close to the shanks 46, both the shanks 46 and the rear wheels 26–32 tend to experience changes in the ground contour simultaneously so that the shanks go up when the wheels go up and the shanks go down when the wheels go down, all to maintain a more uniform tillage depth.

It will also be seen that the "step-up, step-down" construction of the rear beam assemblies 12c, 14c, and 16c, permits the wheels 26–32 to be located at the rearwardly displaced positions illustrated in the present invention to obtain the beneficial uniform tillage depth characteristics. With the clear open windows 64,66,68, and 70 for the rear wheels 26–32, as illustrated in FIG. 3, there is more than ample room for the frame 10 to be lowered down into its ground working positions without interfering with the wheel assemblies 26–32 even though they project rearwardly beyond the rearmost margin of the frame 10.

It will also be appreciated that while many field conditions call for both rows of the tillage shanks 44 and 46, many do not require such heavy-duty action. Moreover, in some cases, it may be desirable to leave additional crop residue in compliance with soil conservation regulations.

Therefore, under those circumstances, it is a simple matter to raise all of the shanks 44 in the front row into their standby positions as illustrated in FIG. 27 by simply actuating the cylinders 58 from the tractor seat. This makes the effective spacing between soil engaging shanks of the machine twice as much as when the front row of shanks 44 is down in operating position, thereby providing a lighter tilling action and leaving more surface residue. By simply reversing the action of the cylinders 58, the front row of shanks 44 can be re-lowered back down into operating position.

When it is desired to adapt the machine for transport, it is a relatively simple matter to elevate the frame and swing the hitch 42 into its end tow position as illustrated in FIGS. 2 and 3. It is also necessary to actuate the cylinders 128 associated with the wheel assemblies 28 and 30 on center frame section 12 to swivel them from their positions transverse to the longitudinal axis of the frame 10 to their transport positions parallel with such axis as illustrated in FIG. 2.

Once the hydraulic cylinders 354 on the hitch 42 have been retracted to swing the linkage 320 away from the left tow beam 316, the vehicle hitched to coupling 322 may be driven rightwardly viewing FIGS. 1 and 2 so as to correspondingly cause the hitch 42 to swing in a rightward direction. Of course, the frame 10 will have first been raised to its upper limit so that the two front gauge wheels 34 and 40 are off the ground. All of the various safety devices for maintaining the frame 10 fully elevated should likewise have been applied by this time.

As the vehicle continues rightwardly and in a clockwise direction, the linkage 320 unfolds about the elbow joint 350 and the hitch 42 ultimately assumes the position in solid lines in FIG. 2 in which it extends along the front of the frame 10 overlying the front margin thereof and parallel to the longitudinal axis thereof. In this disposition, the links 346 and 348 of linkage 320 generally lie along side of the right tow beam 318. As is apparent, the coupling 322 is disposed substantially outwardly beyond the right end of the implement frame 10, providing ample opportunity for the towing vehicle to clear the frame 10. Moreover, it will be noted that the hitch point of the coupling 322 to the towing vehicle is located such that the line of draft from the vehicle is between the front wheel assemblies 36 and 38 on the one hand and the rear wheel assemblies 26–32 on the other hand so as to provide a stable apparatus for being towed along the field or roadways. Preferably, the latch 358 is applied when the hitch 42 is swung to its end tow position of FIG. 2, and if the remaining caster wheels 26,22,36, and 38 have not swiveled into their transport positions by this time, they will certainly do so as the vehicle begins to tow the frame endwise.

When it is time to reestablish the machine for field working, it is a simple matter to release the latch 358 and return the vehicle in a leftward or counterclockwise motion to unfold the hitch 42 from its folded position of FIG. 2. Once the coupling 322 has been brought to its centered position with the extended end 316a of the left tow beam 316 received in the socket 352, the hydraulic cylinders 354 may then be actuated to swing the linkage 320 over against the left tow beam 316, hence locking the hitch 42 in its towing position of FIG. 1.

It should thus be apparent that the present invention as above described achieves many benefits not heretofore available with prior machines. Furthermore, it is apparent that although an illustrative embodiment has been disclosed, many variations could be made by those skilled in the art without departing from the present invention. Accordingly, the present invention should not be limited by the specific embodiment herein disclosed but, only by a fair interpretation of the claims which follow.

I claim:

1. In a tillage implement having a frame and means for supporting the frame at a certain height above the ground as the implement is advanced, the improvement comprising:
   a first non-raiseable transverse row of ground-engageable tools carried by said frame in a position for working the soil a the implement is advanced;
   a transverse beam spaced from said first row of tools in a fore-and-aft direction with respect to the path of travel of the implement during tillage;
   a second raiseable transverse row of ground-engageable tools mounted on said beam at spaced locations along the latter;
   means shiftably mounting said beam on the frame for selective movement in a manner to raise and lower the second row of tools between operating and standby positions while the first row stays down in its working position; and
   power means operably coupled with said beam for effecting said shifting movement whereby to provide the operator of the implement with the ability to selectively change the number of tools disposed for working the soil,
   said tools in the raiseable second row being aligned with spaces between the tools in the first row for working the soil between the tools of the first row when the tools of the second row are in their lowered operating positions.

2. In a tillage implement as claimed in claim 1,
   said means shiftably mounting the beam on the frame comprising hinge means adapting the beam for swinging about an axis transverse to the path of travel of the implement during tillage operations.

3. In a tillage implement as claimed in claim 1,
   said second row of tools being located in front of said first row.

4. In a tillage implement having a frame and means for supporting the frame at a certain height above the ground at the implement is advanced, the improvement comprising:
   a first non-raiseable transverse row of ground-engageable tools carried by said frame in a position for working the soil as the implement is advanced;
   a transverse beam spaced from said first row of tools in a fore-and-aft direction with respect to the path of travel of the implement during tillage;
   a second raiseable transverse row of ground-engageable tools mounted on said beam at spaced locations along the latter;
   means shiftably mounting said beam on the frame for selective movement in a manner to raise and lower the second row of tools between operating and standby positions while the first row stays down in its working position; and
   power means operably coupled with said beam for effecting said shifting movement whereby to provide the operator of the implement with the ability to selectively change the number of tools disposed for working the soil,
   said means shiftably mounting the beam on the frame comprising hinge means adapting the beam for swinging about an axis transverse to the path of travel of the implement during tillage operations,
   said axis of swinging movement of the beam being disposed in spaced parallelism to said longitudinal axis of the beam.

5. In a tillage implement as claimed in claim 4,
   said power means comprising fluid-pressure-operated piston and cylinder means.

6. In a tillage implement as claimed in claim 4,
   said transverse beam being mounted below said frame in disposition for abutting, loadbearing engagement with the frame when the tools are in said operating positions.

7. In a tillage implement having a frame and means for supporting the frame at a certain height above the ground as the implement is advanced, the improvement comprising:
   a first non-raiseable transverse row of ground-engageable tools carried by said frame in a position for working the soil as the implement is advanced;
   a transverse beam spaced from said first row of tools in a fore-and-aft direction with respect to the path of travel of the implement during tillage;
   a second raiseable transverse row of ground-engageable tools mounted on said beam at spaced locations along the latter;
   means shiftably mounting said beam on the frame for selective movement in a manner to raise and lower the second row of tools between operating and standby positions while the first row stays down in its working position; and
   power means operably coupled with said beam for effecting said shifting movement whereby to provide the operator of the implement with the ability to selectively change the number of tools disposed for working the soil,
   said second row of tools being located in front of said first row,
   said tools in the raiseable second row being aligned with spaces between the tools in the first row for working the soil between the tools of the first row when the tools of the second row are in their lowered operating positions.

8. In a tillage implement as claimed in claim 7,
   said means for supporting the frame above the ground including ground wheels aligned with certain tools of the second row behind the latter to reduce the accumulation of trash residue on the ground wheels from the second row of tools.

9. In a tillage implement as claimed in claim 8,
   said frame including rear transverse beam structure carrying said first row of tools,
   said rear beam structure including sections thereof aligned vertically with and disposed above portions of said ground wheels,
   said frame being selectively shiftable vertically relative to said ground wheels for adjusting the vertical positions of the tools,
   said sections of the rear beam structure being offset vertically upwardly with respect to other sections of the rear beam structure to provide clearance for said portions of the ground wheels in all positions of vertical adjustment of the frame.

10. In a tillage implement as claimed in claim 9,
    said first row of tools being mounted on said other sections of the rear beam structure.

11. In a tillage implement having a frame and means for supporting the frame at a certain height above the ground as the implement is advanced, the improvement comprising:

said frame having a rear transverse beam assembly including a series of aligned lower transverse beam members supporting a transverse extending row of ground-engageable tools, said lower transverse beam members being spaced apart at periodic locations along the length of the beam assembly to present a plurality of spaced, open bottom windows in the beam assembly, said means for supporting the frame above the ground including a plurality of ground wheels located directly below and in vertical alignment with said rear beam assembly within said windows, said beam assembly further having horizontally disposed upper transverse beam members across the tops of the windows located at a second elevation higher than the lower transverse members, rigidly secured thereto, and spanning the wheels directly above the latter to provide clearance for the wheels.

12. In a tillage implement as claimed in claim 11, there being a second, front row of ground engageable tools carried by said frame across the front of the latter, the tools of the front row being aligned fore-and-aft with the spaces between tools of the rear row, said ground wheels being aligned fore-and-aft with tools of the front row.

13. In a tillage implement as claimed in claim 12, said front row of tools being mounted on a transverse beam shiftable in a manner to raise and lower the front row of tools between operating and standby positions.

14. In a tillage implement as claimed in claim 13, said transverse beam for the front row of tools being located below said frame and disposed in abutting, load-transferring engagement with the frame when the tools of the front row are in their operating positions.

15. In a farm implement having an elongated frame upon which tools may be mounted for performing field operations as the implement is advanced in a direction transverse to the longitudinal axis of the frame, the improvement comprising:

a plurality of ground wheels supporting said frame for movement in said transverse direction;

a hitch assembly coupled with said frame at the front of the latter for connecting the frame with a towing vehicle, said hitch assembly including a coupling for said towing vehicle located at least generally equi-distantly spaced from opposite lateral ends of the frame when the hitch assembly is in a field working position with its line of draft extending transverse to the longitudinal axis of the frame, said hitch assembly being shiftable from said field working position to a transport position in which said coupling projects outwardly beyond one end of the frame and the line of draft of the hitch assembly is at least generally parallel to said longitudinal axis of the frame, said ground wheels being pivotal into positions parallel with the line of draft of the hitch assembly when the latter is in said transport position; and means for releasably retaining said hitch assembly in either of said field working and transport positions, said hitch assembly including a pair of tow beams pivotally coupled at their rear ends to said frame at spaced locations across the front thereof, said hitch assembly further including an extendible, load-bearing linkage connected between said tow beams in a manner to permit the tow beams to converge forwardly toward said coupling when the hitch assembly is in said working position and to fold inwardly generally along the front of the frame parallel to the longitudinal axis thereof when the hitch assembly is in said transport position, said coupling being carried at the forward end of one of said tow beams, said linkage having a pair of opposite ends and an elbow joint therebetween, one end of said linkage being pivotally connected to said one tow beam adjacent the front end thereof and the other end of said linkage being pivotally connected to the other tow beam adjacent the front end thereof and the other end of said linkage being pivotally connected to the other tow beam adjacent the front end thereof.

16. In a farm implement as claimed in claim 15, said releasable retaining means including fluid-pressure-operated power means operable to releasably hold the linkage in a buckled condition.

17. In a farm implement as claimed in claim 16, said releasable retaining means including a latch adjacent said one end of the frame disposed for releasable retaining engagement with said one tow beam when the hitch mechanism is in said transport position.

18. In a farm implement having an elongated frame upon which tools may be mounted for performing field operations as the implement is advanced in a direction transverse to the longitudinal axis of the frame, the improvement comprising:

a plurality of ground wheels supporting said frame for movement in said transverse direction;

a hitch assembly coupled with said frame at the front of the latter for connecting the frame with a towing vehicle, said hitch assembly including a coupling for said towing vehicle located at least generally equi-distantly spaced from opposite lateral ends of the frame when the hitch assembly is in a field working position with its line of draft extending transverse to the longitudinal axis of the frame, said hitch assembly being shiftable from said field working position to a transport position in which said coupling projects outwardly beyond one end of the frame and the line of draft of the hitch assembly is at least generally parallel to said longitudinal axis of the frame, said ground wheels being pivotal into positions parallel with the line of draft of the hitch assembly when the latter is in said transport position; and means for releasably retaining said hitch assembly in either of said field working and transport positions, certain of said plurality of ground wheels having power means operably coupled therewith for causing said certain wheels to be pivoted between their alternate positions for working or transport, the remaining wheels of said plurality of ground wheels being freely pivotal between their alternate positions in reaction to changes in the line of draft of the hitch assembly relative to the frame.

19. In a farm implement as claimed in claim 18, said hitch assembly including means pivotally connecting the hitch assembly with the frame behind the front of the latter and below the same, said hitch assembly being arched upwardly over the front of the frame for clearing the latter in all positions of the hitch assembly, said hitch assembly overlying the front of the frame when the hitch assembly is in said transport position, said plurality of ground wheels including a set of rear wheels and a set of front wheels relative to the direction of travel of the frame when the hitch assembly is in its working position, said vehicle coupling of the hitch assembly being disposed to position the line of draft between said front set of wheels and the rear set of wheels when the hitch assembly is in said transport position.

20. In a farm implement having an elongated frame upon which tools may be mounted for performing field operations as the implement is advanced in a direction transverse to the longitudinal axis of the frame, the improvement comprising:

a plurality of ground wheels supporting said frame for movement in said transverse direction;

a hitch assembly coupled with said frame at the front of the latter for connecting the frame with a towing vehicle, said hitch assembly including a coupling for said towing vehicle located at least generally equi-distantly spaced from opposite lateral ends of the frame when the hitch assembly is in a field working position with its line of draft extending transverse to the longitudinal axis of the frame, said hitch assembly being shiftable from said field working position to a transport position in which said coupling projects outwardly beyond one end of the frame and the line of draft of the hitch assembly is at least generally parallel to said longitudinal axis of the frame, said ground wheels being pivotal into positions parallel with the line of draft of the hitch assembly when the latter is in said transport position; and means for releasably retaining said hitch assembly in either of said field working and transport positions, said hitch assembly including means pivotally connecting the hitch assembly with the frame behind the front of the latter and below the same, said hitch assembly being arched upwardly over the front of the frame for clearing the latter in all positions of the hitch assembly, said hitch assembly overlying the front of the frame when the hitch assembly is in said transport position, said plurality of ground wheels including a set of rear wheels and a set of front wheels relative to the direction of travel of the frame when the hitch assembly in its working position, said vehicle coupling of the hitch assembly being disposed to position the line of draft between said front set of wheels and the rear set of wheels when the hitch assembly is in said transport position.

21. In a farm implement as claimed in claim 20,
said hitch assembly including a pair of tow beams pivotally coupled at their rear ends to said frame at spaced locations across the front thereof, said hitch assembly further including an extendible, load-bearing linkage connected between said tow beams in a manner to permit the tow beams to converge forwardly toward said coupling when the hitch assembly is in said working position and to fold inwardly generally along the front of the frame parallel to the longitudinal axis thereof when the hitch assembly is in said transport position, said coupling being carried at the forward end of one of said tow beams.

22. In a farm implement as claimed in claim 21,
said linkage having a pair of opposite ends and an elbow joint therebetween, one end of said linkage being pivotally connected to said one tow beam adjacent the front end thereof and the other end of said linkage being pivotally connected to the other tow beam adjacent the front end thereof.

23. In a farm implement having a frame supported by at least one ground wheel and adjustable vertically relative to said wheel for changing the height of the frame above the ground, an improved height control mechanism for the frame;

a fluid-pressure-operated, extensible and retractable power unit coupled with the frame;

an elongated, flexible linkage anchored at one end to the power unit and displaceable linearly by extension and retraction of the power unit, said linkage being anchored at its opposite end to said ground wheel; and purchase structure on said frame and entrained by the linkage between said opposite end thereof in a manner to cause the frame to be raised and lowered as the power unit is operated, said ground wheel being provided with an arm swingably attaching the wheel to the frame for raising and lowering the latter as the wheel is swung toward and away from the frame, said arm being provided with an upright post adjacent said purchase structure nd reciprocable vertically relative thereto during said swinging of the wheel, said post having an upper portion engaged with said linkage and projecting upwardly beyond said purchase structure for maintaining the linkage looped under the purchase structure as the power unit is operated to displace the linkage.

24. In a farm implement as claimed in claim 23,
said frame including a pair of hingedly interconnected sections, each of said sections having its own ground wheel supporting the corresponding section for over-the-ground travel and being relatively shiftable toward and away from its frame section for height adjustment thereof, said linkage including a first length coupled with one of said wheels and a second length coupled with the other of said wheels for causing simultaneous shifting of both wheels toward and away from their corresponding frame sections regardless of the hinged position of the two sections relative to one another.

25. In a farm implement as claimed in claim 23,
said purchase structure comprising a sheave rotatably mounted on the frame.

26. In a farm implement as claimed in claim 25,
said linkage including a chain looped under the sheave.

27. In a farm implement as claimed in claim 23,
said frame being provided with a releasable retainer for holding the post in a lowermost, extended position relative to the frame corresponding to a raised condition of the frame.

28. In a farm implement as claimed in claim 27, said releasable retainer including means defining an abutment selectively shiftable along the frame into and out of a position overlying the upper end of the post when the latter is in said lowermost extended position.

29. In a farm implement having a frame supported by at least one ground wheel and adjustable vertically relative to said when for changing the height of the frame above the ground, an improved height control mechanism for the frame comprising:

a fluid-pressure-operated, extensible and retractable power unit coupled with the frame;

an elongated, flexible linkage anchored at one end to the power unit and displaceable linearly by extension and retraction of the power unit, said linkage being anchored at its opposite end to said ground wheel; and purchase structure on said frame and entrained by the linkage between said opposite end thereof in a manner to cause the frame to be raised and lowered as the power unit is operated, said frame having a second ground wheel spaced from said one ground wheel and coupled with the frame for relative movement toward and away from the latter to effect height adjustment of the frame, said second ground wheel having motion-transmitting apparatus operably coupled therewith and with said linkage for causing simultaneous operation of the ground wheels during operation of said power unit.

30. In a farm implement as claimed in claim 29, said motion-transmitting apparatus including an elongated member mounted on said frame for rotation about the longitudinal axis of the member, said member having a first crank coupled with said linkage and a second crank coupled with said second wheel.

31. In a farm implement having a frame provided with a center frame section and at least two lateral wing sections hingedly coupled with said center section, the center frame section having at least a pair of ground wheel assemblies and each of said wing sections having at least a single ground wheel assembly, said wheel assemblies supporting the frame sections for over-the-ground travel and being shiftable relatively toward and away from the same to adjust the height of the sections above the ground, an improved height control mechanism for said frame comprising:

a fluid-pressure-operated, extensible and retractable power unit mounted on said center frame section;

linkage means connecting the power unit with the ground wheel assemblies of the frame sections for effecting simultaneous shifting thereof relative to their frame sections during extension and retraction of the power unit, said linkage means including a first flexible linkage interconnecting the power unit, one ground wheel assembly of the center section and a ground wheel assembly of one of said wing sections, said linkage means further including a second flexible linkage interconnecting the power unit, a second ground wheel assembly of the center section and a ground wheel assembly of the other of said wing sections;

purchase structure on said frame sections for each of said ground wheel assemblies respectively entrained by a corresponding portion of the first or second flexible linkages; and an upright post on each ground wheel assembly respectively disposed adjacent the corresponding purchase structure and reciprocable vertically relative thereto during swinging of the corresponding wheel assembly toward and away from the frame, each of said posts having an upper end engaged with the linkage portion which is entrained around the proximal purchase structure and projecting upwardly beyond said proximal purchase structure in a manner to cause the frame sections to be raised and lowered as the power unit is operated.

32. In a farm implement as claimed in claim 31, said center frame section having a second pair of ground wheel assemblies spaced from said first pair thereof and coupled with the center frame section for relative movement toward and away from the latter during height adjustment, each of said second wheel assemblies having a motion-transmitting apparatus operably coupled between the same and a corresponding one of said flexible linkages for causing simultaneous operation of the first pair of ground wheel assemblies of the center section and the second pair of ground wheel assemblies of the center section during operation of said power unit.

33. In a farm implement as claimed in claim 32, each purchase structure comprising a sheave rotatably mounted on its frame section.

34. In a farm implement as claimed in claim 33, each flexible linkage including a chain looped under its corresponding sheave.

35. In a farm implement as claimed in claim 32, each motion-transmitting apparatus including an elongated member mounted on said center frame section for rotation about the longitudinal axis of the member, each member having a first crank coupled with a corresponding one of said flexible linkages and a second crank coupled with a corresponding one wheel assembly of said second pair of wheel assemblies.

each flexible linkage including a chain looped under its corresponding sheave.

36. In a farm implement as claimed in claim 32, said frame sections being provided with releasable retainers for holding the posts of the wheel assemblies in lowermost, extended positions when the frame sections are fully raised.

37. In a farm implement as claimed in claim 36, each of said releasable retainers including means defining an abutment selectively shiftable along the corresponding frame section into and out of a blocking position overlying the upper end of the corresponding post when the latter is in said lowermost extended position.

* * * * *